(12) United States Patent
Cheddad et al.

(10) Patent No.: US 8,670,560 B2
(45) Date of Patent: Mar. 11, 2014

(54) ENCRYPTION METHOD

(75) Inventors: Abbas Cheddad, Londonderry (GB); Joan Condell, Coleraine (GB); Kevin Curran, Derry (GB); Paul McKevitt, Londonderry (GB)

(73) Assignee: University of Ulster, Coleraine (GB)

( * ) Notice: Subject to any disclaimer, the term of this patent is extended or adjusted under 35 U.S.C. 154(b) by 229 days.

(21) Appl. No.: 13/125,799

(22) PCT Filed: Oct. 22, 2009

(86) PCT No.: PCT/EP2009/007555
§ 371 (c)(1),
(2), (4) Date: Aug. 8, 2011

(87) PCT Pub. No.: WO2010/046104
PCT Pub. Date: Apr. 29, 2010

(65) Prior Publication Data
US 2011/0311042 A1    Dec. 22, 2011

(30) Foreign Application Priority Data

Oct. 23, 2008  (GB) .................................. 0819443.3
Oct. 31, 2008  (GB) .................................. 0819976.2

(51) Int. Cl.
*G06F 21/00*    (2013.01)

(52) U.S. Cl.
USPC .......................................................... 380/28

(58) Field of Classification Search
USPC .......................................................... 380/28
See application file for complete search history.

(56) References Cited

U.S. PATENT DOCUMENTS

| | | | |
|---|---|---|---|
| 7,389,420 B2* | 6/2008 | Tian | 713/176 |
| 2004/0174999 A1 | 9/2004 | Iwamura | |
| 2008/0205644 A1* | 8/2008 | Lee et al. | 380/210 |

OTHER PUBLICATIONS

Menezes, Vanstone, Oorschot: "Handbook of Applied Cryptography", 1997, CRC Press LLC, USA.
European Patent Office (International Search Authority), International Preliminary Patentability Report and International Search Report, PCT/EP2009/007555, Apr. 26, 2011.

* cited by examiner

*Primary Examiner* — Hadi Armouche
*Assistant Examiner* — Dao Ho
(74) *Attorney, Agent, or Firm* — IpHorgan Ltd.

(57) ABSTRACT

There is described a method of encrypting a set of 2D input data, preferably image data. The method comprises obtaining the hash value of a password and re-sizing the hash value to fit the size of the 2D input data. The re-sized data is transformed using an irreversible transform, and the output of the transform is then used to encode the 2D data.

40 Claims, 19 Drawing Sheets

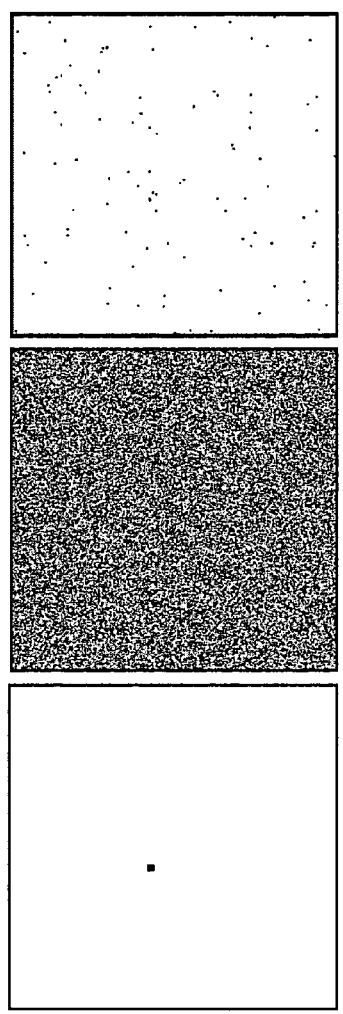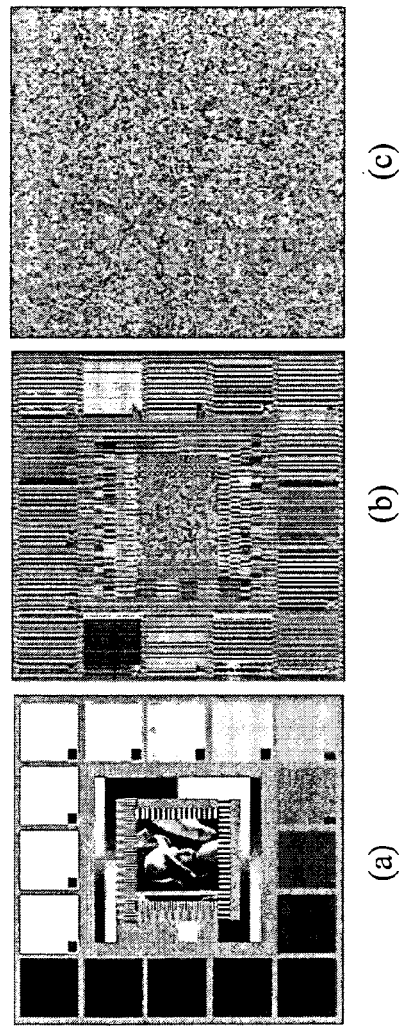
Fig. 10
Fig. 11

>> Or

Or_before_Swap =

193  125  120   19
102  233  139    9
254   12   27  124
215  120  115  120

>> After swap using the new map for pixel substitution (map)
Values falling on map(0) are replaced with values falling on map(1) and vice versa Or_after_Swap =

102  233   12  120
193  125    9  139
215  120  120  115
254   27  124   19

>> map map =

0  1  1  0
1  0  0  1
1  0  0  1
0  1  1  0

Swap in Matrix form
(a)

Or_before_Swap =

193  102  254  215  125  233   12  120  120  139   27  115   19    9  124  120

Or_after_Swap =

102  193  215  254  233  125  120   27   12    9  120  124  139  115   19

Map =

0  1  1  0  1  0  0  0  1  0  0  1  0  1  1  1 indexes_of_ones_in_Map =

2  3  5  9  11  14  15  16 indexes_of_zeros_in_Map =

1  4  6  7  8  10  12  13

Swap in vector form
(b)

Fig. 21

ENCRYPTION METHOD

CROSS-REFERENCE TO RELATED APPLICATIONS

This application claims priority to International Application No. PCT/EP2009/007555, filed on Oct. 22, 2009, which in turn claims priority to United Kingdom Patent Applications No. 0819443.3 and 0819976.2, filed Oct. 23, 2008 and Oct. 31, 2008 respectively, the contents of which are hereby incorporated by reference.

FIELD OF THE INVENTION

This invention relates to a method of encrypting 2D data sets with password protection, more particularly for encrypting image data.

BACKGROUND OF THE INVENTION

Much research has been done in the area of steganography, which is the science of concealing data in a transmission medium in such a way that it does not draw the attention of eavesdroppers. Steganography has various useful applications, such as for human rights organizations (i.e. as encryption is prohibited in some countries); smart IDs where the identification details of individuals are embedded in their photographs (i.e. content authentication); data integrity (i.e. by embedding a checksum value); medical imaging; and secure transmission of medical data, to name a few. Various algorithms have been proposed to implement steganography in digital images.

Essentially, there are three major clusters of algorithms (references provided at the end of the description): (1) algorithms using the spatial domain, such as S-Tools (Brown, 1996); (2) algorithms using the transform domain, for instance F5 (Westfeld, 2001); and (3) algorithms taking an adaptive approach, combined with one of the former two methods, for example ABCDE (A Block-based Complexity Data Embedding) (Hioki, 2002).

Most of the existing steganographic methods rely on two factors: the secret key and the robustness of the steganographic algorithm. However, all of them either do not address the issue of encryption of the payload prior to embedding or merely give a hint of using one or more of the conventional block cipher algorithms.

The renowned generic block cipher algorithms, such as Data Encryption Standard (DES), Advanced Encryption Standard (AES), International Data Encryption Algorithm (IDEA), etc., are not suitable to handle relatively bulky data, e.g. digital images, for their long computational process (Usman et al., 2007). Various hash algorithms are available, such as MD5 (Message Digest 5), Blowfish, and SHA-1 (Secure Hash Algorithm 1), which hash data strings, thus changing their state from being natural to a seemingly unnatural state. A hash function is formally defined as the mapping of bit strings of an arbitrary finite length to strings of fixed length (Yang et al., 2008).

Encryption is particularly useful for Intellectual Property Management and Protection (IPMP) standardisation groups, as well as multimedia communications that prefer handling media streams compliant to particular multimedia coding standards, such as JPEG or MPEG-1/2/4 standard (Wen et al., 2002).

The research on the design of secure encrypted images tends to focus on transferring images into chaotic maps. Chaos theory, which essentially emerged from mathematics and physics, deals with the behaviour of certain nonlinear dynamic systems that exhibit a phenomenon under certain condition known as 'chaos', which adopts the Shannon requirement on diffusion and confusion (Shih, 2008). Due to its attractive features such as its sensitivity to initial condition and random-like outspreading behaviour, chaotic maps are employed for various applications of data protection (Yang et al., 2008).

In the realm of 2D data, Shih (Shih, 2008) outlines the following method, called Arnold's cat map, in order to spread the neighbouring pixels into largely dispersed locations:

$$\begin{bmatrix} x' \\ y' \end{bmatrix} = \begin{bmatrix} 1 & 1 \\ l & l+1 \end{bmatrix} \begin{bmatrix} x \\ y \end{bmatrix} \bmod N \quad (1)$$

$$\text{where } \det\left(\begin{bmatrix} 1 & 1 \\ l & l+1 \end{bmatrix}\right) = 1 \text{ or } -1,$$

and l and N denote an arbitrary integer and the width of a square image respectively. The determinant here is referred to as 'der'.

Applying Equation (1) to the sample image 'Lena', with reference to FIG. 1, it can be seen that after exactly 17 iterations, termed as the stable orbit, the chaotic map converged into the original image. This Discrete Time Dynamic System (DTDS) is also the basic framework used in (Lou, D. C and Sun, C. H, 2004).

Regarding this method, it is important to note:

A) Since the algorithm uses a determinant in its process, the input matrix can only be square. This constraint was highlighted also by (Usman et al., 2007). A work around this problem might be in applying the algorithm on square blocks of a given image repetitively. However, it would generate noticeable peculiar periodic square patterns, given the nature of the process.

B) As far as the security systems are concerned, the convergence of the translated pixels into their initial locations, i.e. image exact reconstruction after some iteration, is also not an appealing factor. This is an observed phenomenon in variety of chaotic based algorithms. Given one of the iterations is used, if an attacker gains knowledge of the algorithm and obtained the parameter "1", which is relatively easy to crack using brute force, he will be able to invest some time to add more iterations that will reveal the original image. For example, Wang et al. (2007) show that for such systems if two parameters are set to 10 and 8, then regardless of image contents, any image with the dimensions of 256×256 will converge after 128 iterations. This periodicity brings insecurity to the process (Ashtiyani et al., 2008) as methods for computing the periodicity can be formulated such as the one proposed by Bing and Jia-wei (2005).

In a more detailed and concise attempt to introduce image encryption, Pisarchik et al. (2006) demonstrated that any image can be represented as a lattice of pixels, each of which has a particular colour. The pixel colour is the combination of three components: red, green, and blue, each of which takes an integer value C=(Cr, Cg, and Cb) between 0 and 255. Thus, they create three parallel CMLs (Chaotic Map lattices) by converting each of these three colour components to the corresponding values of the map variable $x_c=(x_c^r, x_c^g, x_c^b)$ and use these values as the initial conditions, $x_c=x_0$.

Starting from different initial conditions, each chaotic map in the CMLs, after a small number of iterations, yields a different value from the initial conditions, and hence the image becomes indistinguishable because of an exponential divergence of chaotic trajectories (Pisarchik et al., 2006). Pisarchik introduced seven steps for encrypting images and seven steps for decryption. The algorithm does not encompass any conventional hash algorithm, i.e., MD's family, SHA's family or Blowfish. Moreover, four parameters were used of which one was set constant and another two were regulated. The settings used can impact a tremendous change to the chaotic map quality, as can be seen from FIGS. 2 and 3. Therefore, the receiver must know the decryption algorithm and the parameters which act as secret keys.

The authors suggest that the algorithm yields good results for RGB images. However, the authors used a rounding operator, which was applied recursively along the different iterations. One concern regarding this method is the difficulty of recovering the exact intensity values of the input image, as the recovered image shown in the paper might be just an approximation because of the aforementioned operator. This is important, especially in the application of steganography, where it is desirable to recover the exact embedded file rather than its approximation. This particular point was remarked independently by Kanso and Smaoui (2007), where it was stated that a sensitive generator, e.g. a generator with a rounding operator, can produce two different binary sequences (after some iterations) for the same initial values and parameters, if generated on two different machines which round off fractions after unmatched decimal places.

Usman et al. (2007) describe a method for generating a chaotic map for apparently encrypting medical images by repetitive pixel arrangement and column and row permutations. The pixel arrangement is achieved through the following system:

$X(i,j) \rightarrow Y(k,l),$ where $k=\lfloor (j+(i-1)N-1)/L \rfloor +1$ $l=(j+(i-1)N-1) \bmod (L)+1$ (2)

Here, k, l denote the mapped spatial coordinates of the original location at i, j. N and L are the height of the original image and transformed image respectively in such a way that:

$\Pi(K,L)=\Pi(M,N),$ where $K \neq M$

The authors show some experiments in which the deciphered phase was missing. It is suspected that the rounding operator introduced in Eq. (2) will force some pixels to collude at the same location resulting in lose of information needed for the original image reconstruction. Zou et al. (2005) reduce the number of iterations in their work by using 2D generalised Baker transformation to enhance the key space.

Ultimately, the aforementioned methods scramble image pixels using some control parameters and a number of iterations. It is worth noting here that there are several similar two dimensional image chaotic maps introduced in the literature, the most popular being Arnold Cat map, Baker map and Tent map. Discussions on these maps can be found in (Fridrich, 1997). A survey on image encryption is provided in (Shujun et al., 2004).

Generally speaking, chaos keeps image statistics intact, and as a result pixel intensities remain the same. However, the close relationship between chaos and cryptography makes a chaos based cryptographic algorithm a natural candidate for secure communication (Ashtiyani et al., 2008). The two Shannon requirements, confusion and diffusion, must be met when attempting to have any secure cipher algorithm (Claude, 1949). Chaos, given its nature of data scrambling, satisfies the first requirement but not the second, as has been stated earlier that pixel values are not changed.

Other type of image encryption include Fourier plane encoding algorithm, introduced by Refregier and Javidi (1995), which is attacked by Gopinathan et al. (2005) using an initial guess of the Fourier plane random phase while searching over a key space to minimise a cost function between the decrypted image for a given key and the original image. This spurred a variety of authors to apply the Fourier transform such as (Singh et al., 2008 and Joshi, et al., 2008).

One-time pad hash algorithms were believed to be unsuitable for image encryption, since they would require a key of the size of the ciphered image itself (Usman et al., 2007). Sinha and Singh (2003) use MD5 to generate image signature by which they encrypt the image itself using bitwise XOR operation; they coupled that with error control code, i.e. Bose-Chaudhuri Hochquenghem (BCH). The ciphered image was larger than the original because of the added redundancy due to applying the BCH. Since the message digest is smaller than the image, they XOR the signature block by block, which eventually left some traces of repetitive patterns. Hence, this method was commented on by Encinas and Dominguez, (2006) in which it was shown also how insecure the method is by some experiments, a fact that provoked Sinha and Singh, (2003) to debate the arguments raised by Encinas and Dominguez in their published reply (Sinha and Singh 2006).

In Martinian et al. (2005), an encryption key is derived from a user's biometric image itself. The added advantage is that, unlike normal passwords, the key is never stored in the open, and the user has no need to carry or remember it. However, this scheme has a number of potential flaws, one of which occurs when the biometric image is stolen—unlike passwords, a user's image is impossible to replace. Also, the same biometric image can be grabbed with different intensities, depending on intrinsic factors such as camera model, resolutions etc., or extrinsic aspects, such as environment changes, e.g. light.

In relation to specific implementations of encryption algorithms, steganography is often used in the field of biometrics. To protect photographs of individuals on ID cards, government bodies often use a physical watermark on the photos using either an iron stamp which is half visible, or a normal stamp. This fragile shield of security can be easily deceived by mimicking the same stamp.

The biometric security measurement relies heavily on facial feature extraction, and it is important to have the system integrated into an external database with a real time connection to double check for identities. On the other hand, systems on chip can be relatively expensive to roll out, and often require dedicated hardware. In addition, some chip circuits can be reverse engineered using a Radio Frequency Identification (RFID) technology. This happened recently[1] in the Netherlands, where two students from the University of Amsterdam broke the Dutch Public Transit Card.

Recently, there have been large scale losses of personal sensitive data in the UK, e.g. the loss of 25 million child benefit records after HMRC sent two unregistered/unencrypted discs to the National Audit Office, and also the theft of a laptop from a Navy officer with personal details of 600,000 people. These incidents inspired further applications of steganography, which aim to develop a highly secure large-scale database using the so-called security by obscurity approach.

It is an object of the invention to provide a method of encrypting images, which is suitable for use in steganographic applications.

SUMMARY OF THE INVENTION

Accordingly, there is provided a method of encrypting a set of two-dimensional (2D) input data, the method comprising the steps of:
  (a) providing a one-dimensional (1D) hash string H(P);
  (b) resizing the 1D hash string H(P) to a 2D hash string;
  (c) performing a transform operation on the 2D hash string; and
  (d) encoding the set of 2D input data to be encrypted based on the transformed 2D hash string to provide an encrypted 2D data set.

The use of a 1D hash string which is then resized to apply to 2D data sets results in increased robustness of encryption. The resized 2D hash string is transformed in order to increase the diffusion of the resized hash.

Preferably, the step of providing a 1D hash string comprises generating a 1D hash string H(P) by applying a hash function to a password P.

Preferably, step (b) includes the step of converting the 1D hash string H(P) into the binary equivalent of H(P).

Preferably, the 2D input data comprises an image file defined in a multi-dimensional colour space. However, the 2D input data may comprise any known file format that is capable of being represented electronically as a two-dimensional data set.

Preferably, the step (d) of encoding the set of 2D input data to be encrypted comprises:
  (i) generating a binary pseudorandom map based on the transformed 2D hash string; and
  (ii) generating an encrypted 2D data set by performing a logical XOR operation using the binary pseudorandom map and the bit stream version of the 2D input data.

As a pseudorandom map is used, the reconstruction of the password phrase is impossible, resulting in a one-way hash function, which increases the resistance of the encryption algorithm to attacks.

Preferably, step (d)(ii) further comprises the step of converting the XORed bit stream into grayscale values to generate an encrypted 2D data set.

Preferably, the method further comprises the step of resizing the encrypted 2D data set to have the same dimensions as the 2D input data.

Preferably, the binary pseudorandom map is generated such that:

$$\text{Map}(x, y) = \begin{cases} 1 & \text{iff } f(u, v) > thr_1 \\ 0 & \text{otherwise} \end{cases}$$

where Map(x,y) is the binary pseudorandom map, f(u,v) is an input function based on the transformed 2D hash string, and $thr_1$ is a threshold value.

Depending on the requirements of the system, $thr_1$ may be a tuneable threshold value. In addition, if f(u,v) is a complex function, the threshold may be determined based on the imaginary part of the function.

Preferably, $thr_1$ is chosen such that the probability $P(f(u,v)<thr_1)=P(f(u,v)>thr_1)$. As the threshold value is chosen such that the probabilities are equal, this results in a pseudorandom output for the binary map.

Preferably, $thr_1=0$.

Preferably, said step (d)(ii) is performed such that the set of 2D input data, A, and the encrypted 2D data set, A', conform to the relationship:

$$\{A-D(A',Map)\}=\{\emptyset\}$$

where D(A',Map) is the decoding of A' and Map is the binary pseudorandom map.

Preferably, the transform operation comprises a Discrete Cosine Transform (DCT) and a Fast Fourier Transform (FFT).

Preferably, in step (b), the bit stream of the 1D hash string H(P) is resized to a 2D matrix.

Preferably, the hash function used is SHA-1

Preferably, in step (c), the bit stream of the 2D input data is resized to have the dimension of 8×(Π(M,N)), where M×N is the dimension of the bit stream of the 2D input data.

Preferably, the 2D matrix has a fixed dimension of 8×35. This is to accommodate 8-bit grayscale images, having 35 characters.

Preferably, the transform operation comprises:

$$f(u, v) = \frac{1}{8MN}\sum_{x=0}^{7}\sum_{y=0}^{MN-1} F(x, y)e^{-2\pi i(xu/8 + yv/MN)}$$

where F(x,y) is based on DCT($\lambda_{8,MN}$) subject to a transform thresholding operation, wherein $\lambda_{8,MN}$ is the resized 2D bit stream of the 1D hash string H(P), the subscripts 8 and MN denote the width and height respectively Of the resized 2D bit stream, and wherein M and N are the width and height dimensions of the original 2D input data.

Preferably, the transform thresholding operation is:

$$F(x, y) = \begin{cases} 1 & \text{iff } DCT(\lambda_{8,MN}) > thr_2 \\ 0 & \text{otherwise} \end{cases}$$

where F(x,y) is the input into the transform operation f(u,v), DCT($\lambda_{8,MN}$) is the Discrete Cosine Transform of the resized 2D bit stream of the 1D hash string H(P), and $thr_2$ is a threshold value.

Preferably, $thr_2$ is chosen such that the probability $P(F(x,y)<thr_2)=P(F(x,y)>thr_2)$.

Depending on the requirements of the system, $thr_2$ may be a tuneable threshold value. In addition, as DCT($\lambda_{8,MN}$) is a complex function, the threshold is determined based on the imaginary part of the function.

Preferably, the 2D image data set comprises an image file defined in a multi-dimensional colour space, and wherein the step of generating an encrypted 2D image data set comprises:
  performing a plurality of logical XOR operations using a binary pseudorandom map and the bit stream version of each of the colour space components of the 2D image input data to generate encrypted colour space data sets; and
  combining the encrypted colour space data sets to form the encrypted 2D image data set.

Preferably, steps (a) to (c) and (d)(i) are repeated to provide a binary pseudorandom map for each colour space component of the 2D image data set.

The use of different pseudorandom maps for each colour space component results in reduced patterning, and increases the strength of the algorithm.

Preferably, step (a) comprises providing an individual 1D hash string for each colour space component of the 2D image data set. Alternatively, a different password is provided for each individual colour space component.

Preferably, step (a) comprises generating individual 1D hash strings for each colour space component based on a password P, wherein said individual 1D hash strings are based on a combination of different string reading directions and/or multiple hashing operations.

Preferably, the 2D image data set is defined in three-dimensional colour space.

Preferably, the three-dimensional colour space is RGB space.

Preferably, three different 1D hash strings are generated, the hash strings comprising H($\vec{P}$) H($\overleftarrow{P}$) and H($\overleftrightarrow{P}$), wherein the arrows indicate the string reading directions.

This allows for three different 1D hash strings to be generated from a single password, which increases the convenience of the algorithm for a user as only one password must be initially provided.

Preferably, said transform operation is performed on a permuted version of the 2D hash string.

Preferably, said permuted version of the 2D hash string is generated by performing a pseudorandom permutation operation on said 2D hash string.

Preferably, said pseudorandom permutation is based on the output of a pseudo-random number generator, wherein the seed for the pseudo-random number generator is selected from one of the following: the 1D hash string H(P); or an unhashed 1D password P.

It will be understood that the above methods may further comprise a post-encryption step, the step comprising:
(i) providing an element substitution map based on the 1D hash string H(P); and
(ii) performing an element substitution operation based on said element substitution map on the elements of said encrypted 2D data set to generate an element-substituted encrypted 2D data set.

There is also provided a further method of encrypting a set of two-dimensional (2D) input data, the method comprising the steps of
(a) providing a 2D hash array;
(b) performing a transform operation on the 2D hash array;
(c) generating a binary pseudorandom map based on the transformed 2D hash array; and
(d) generating an encrypted 2D data set by performing a logical XOR operation using the binary pseudorandom map and the bit stream version of the 2D input data.

The encryption method is adaptable to be used with any 2D hash array generated by an existing 2D hash algorithm, e.g. HAVAL, MD2, MD4, MD5, SHA-0, SHA-2, etc.

It is this element-substituted encrypted 2D data set that can be securely transmitted to an associate. Such an element substitution operation improves the resistance of the method to Chosen-Plaintext Attacks (CPA).

Preferably, said step of providing comprises generating said element substitution map by applying a hash function to the 1D hash string H(P).

There is further provided a method of decrypting a set of 2D data encrypted according to any of the above methods.

There is also provided a computer-readable storage medium having recorded thereon instructions which, when executed on a computer, are operable to implement the steps of the methods outlined above.

There is further provided encryption systems operable to implement the steps of the methods described above.

DETAILED DESCRIPTION OF THE INVENTION

An embodiment of the invention will now be described, by way of example only, with reference to the accompanying drawings, in which:

FIG. 10 shows (a) an original image, and the encrypted version of the image when using (b) the method of the present invention, and (c) a Baker map;

FIG. 11 shows (a) an original image, and the encrypted version of the image when using (b) 128-bit AES running in ECB mode, and (c) the method of the present invention;

FIG. 21 illustrates how the pixel substitution process is performed for a sample data set;

It is intended to extend the 1-D hashing algorithm SHA-1 to encrypt digital 2D data. The terminology and functions used as building blocks to form SHA-1 are described in the US Secure Hash Algorithm 1, see the reference. The introduction of Fast Fourier Transform (FFT) forms together with the output of SHA-1 a strong image encryption setting. It is shown that the SHA-1 algorithm, which is a one-time pad hash algorithm, can meet both requirements of confusion and diffusion with a hashed key.

Figure 1:
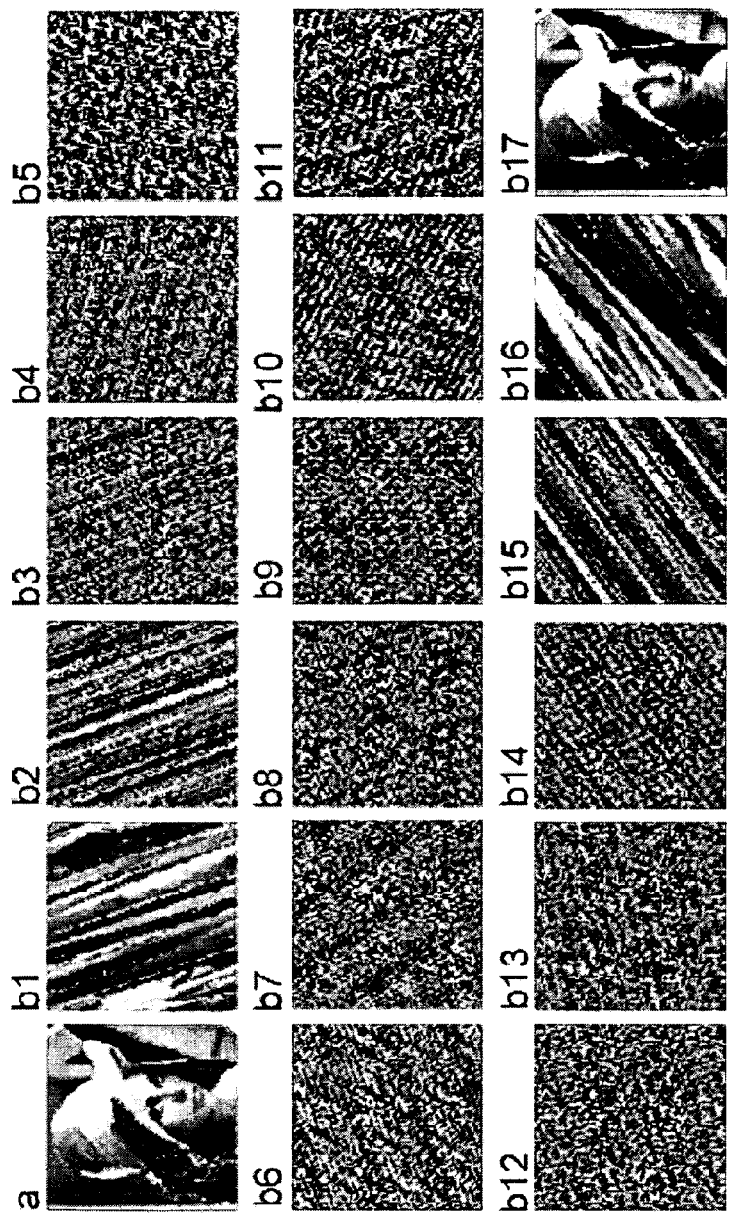
FIG. 1 shows the different iterative results of applying Eq. (1) with 1=2 on the image 'Lena' of size (101×101) (Shih, 2008)
Figure 2:
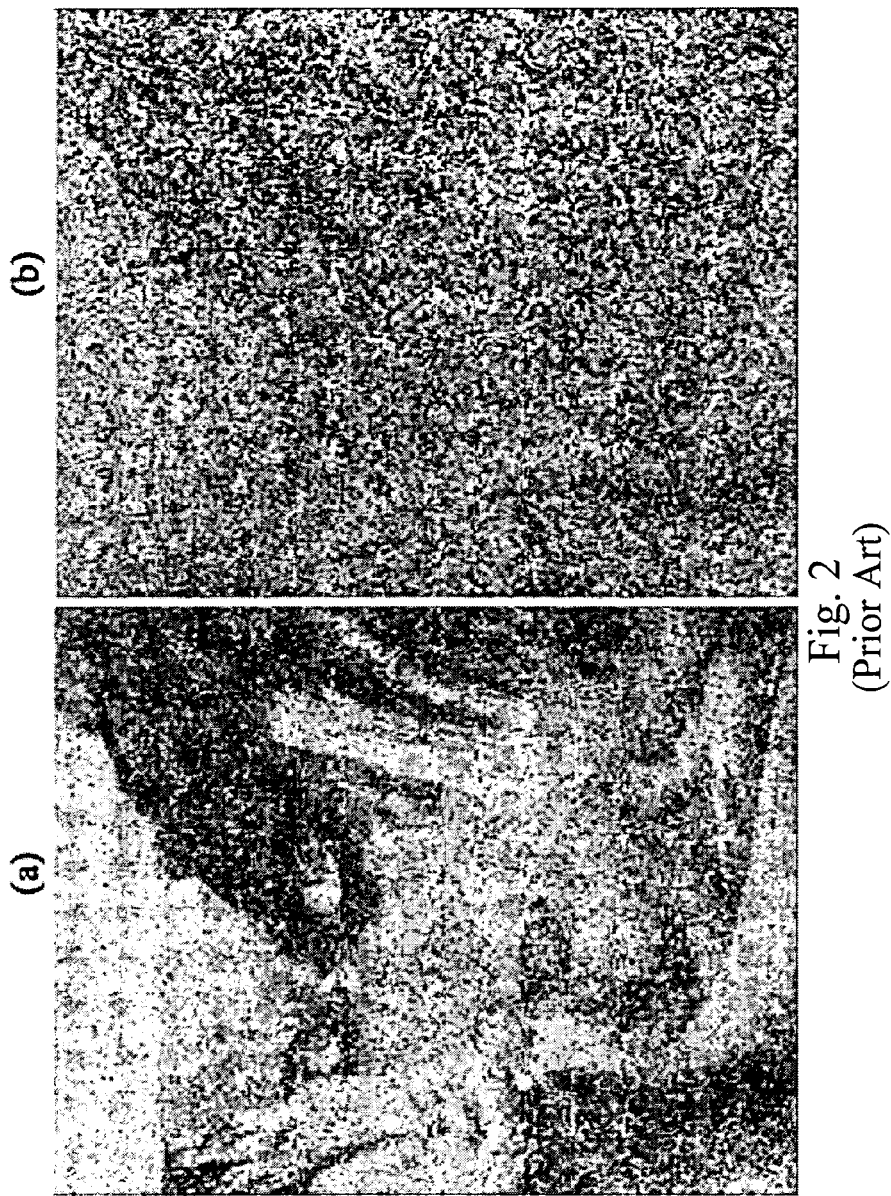
FIG. 2 shows colour sensitivity of the image "Mother Nature" to a number of cycles (a=3.9 and n=75), where image (a) is encoded with j=1, and image (b) is encoded with j=2 (Pisarchik et al., 2006)
Figure 3:
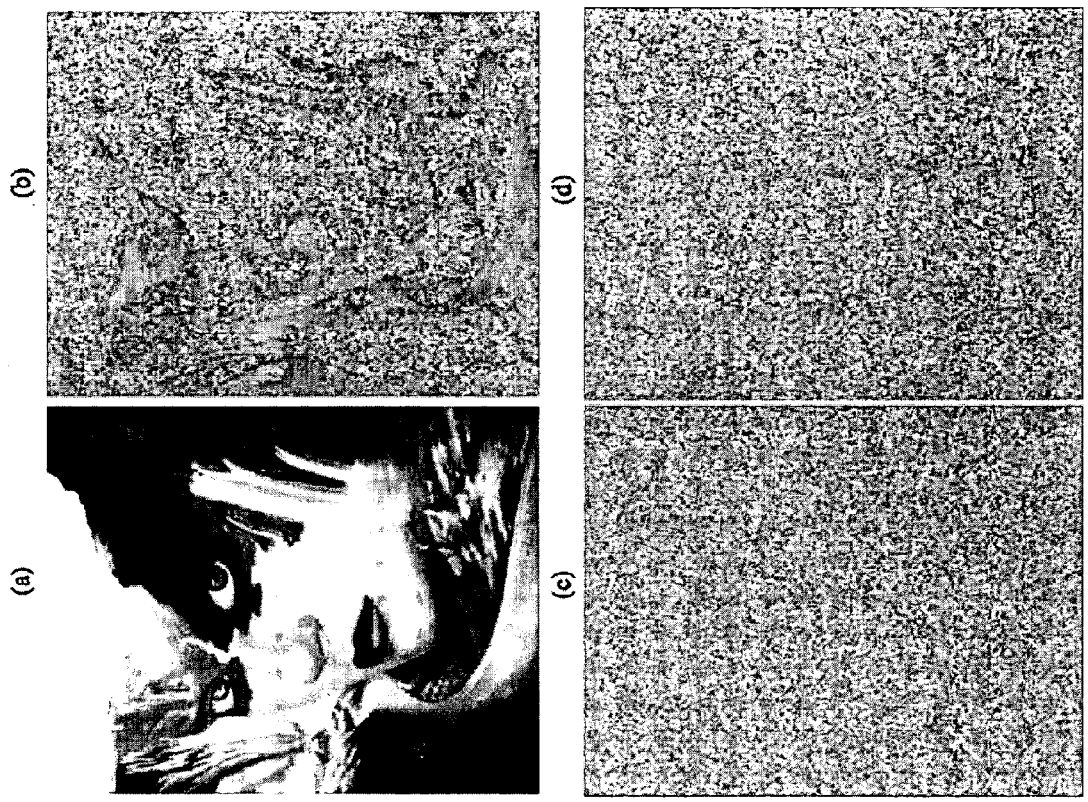
FIG. 3 shows the colour sensitivity of the image "Mother Nature" to a number of iterations (a=3.9 and j=3), where (a) is the original image, (b) is the image encoded with n=1, (c) is with n=30, and (d) is with n=75 (Pisarchik et al., 2006)
Figure 4:
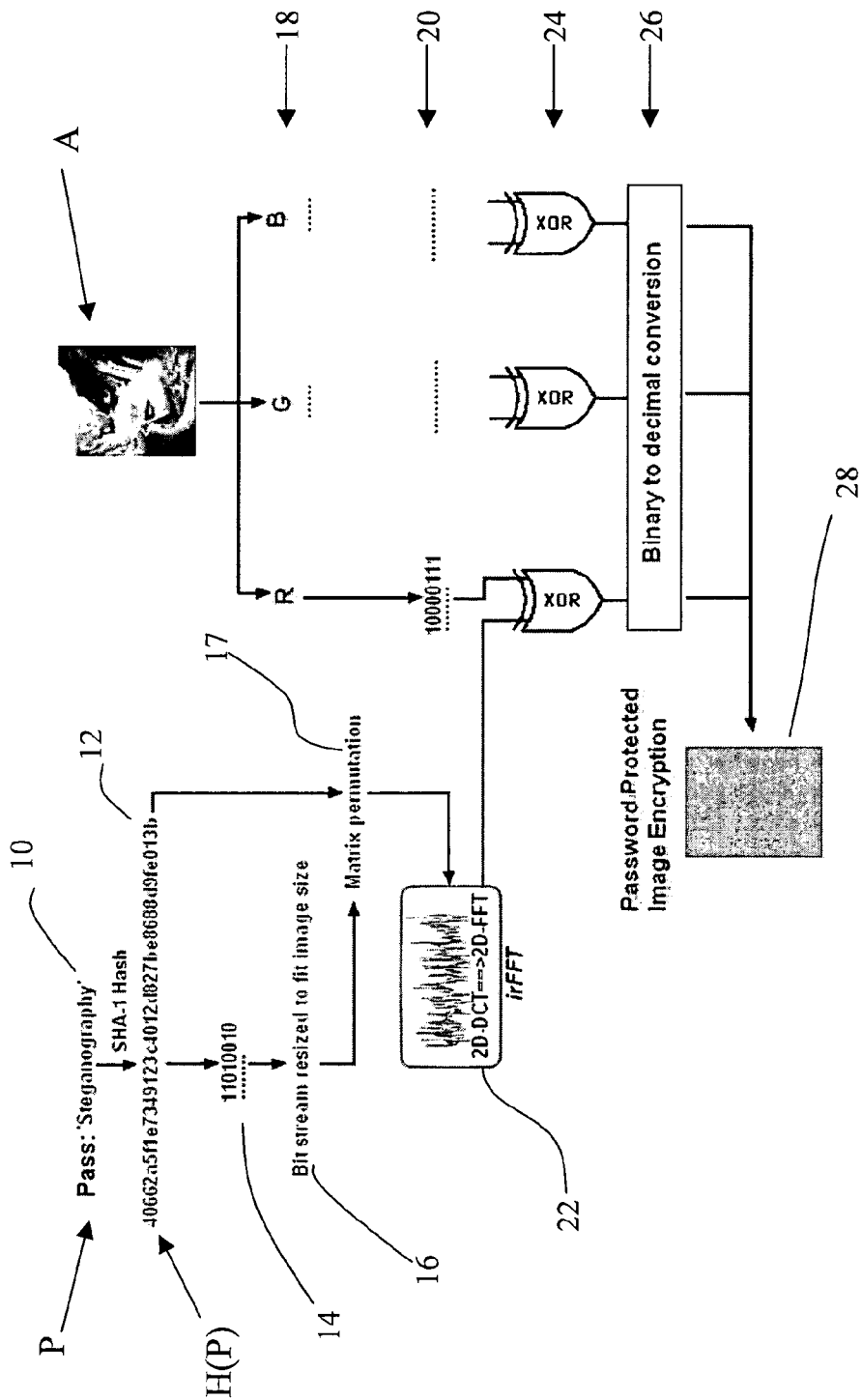
FIG. 4 is an overview of the image encryption method of the invention.

The encryption method of the invention is illustrated in FIG. 4. The method can be seen as being in the opposite direction of what Fridrich and Goljan (2000) proposed, where they use a key to a 64×64 image block to return a hash of length N=50 bits. However, in the method of the present invention, the strength of a 1D encryption algorithm is exploited (namely SHA-1), and it is extended to handle 2D data such as images. The FFT is incorporated into the process to increase the disguise level, and thus generate a random-like output that does not leave any distinguishable patterns of the original image.

The method of the invention starts with a password phrase P supplied by the user (step 10). This password phrase P is then used to generate an SHA-1 based hash string H (P), by applying the hashing function to P (step 12). H(P) is in "char", or character format, which is then converted into the appropriate binary bit stream (step 14). The bit stream vector of H(P) can then be transformed to a matrix of fixed dimension, e.g. 8×35.

Parallel to this, the original image A is provided in RGB colour space (i.e. the image can be represented as three different channels of data representing the Red, Green and Blue colour spaces of the image respectively) (step 18). It will be understood that any suitable colour space implementation may be used in place of RGB colour space.

The three different channels are converted to a bit stream and reshaped to have the dimension of 8×(Π(M,N)) (step 20), where M and N are the height and width respectively of the image A. (The formula (Π(a,b)) is used to refer to the product of terms a and b.)

The dimension 8×35 is chosen for convenience sake, i.e. if the method is dealing with the encryption of 8-bit grayscale images, or 24-bit RGB colour image files, then 8 is from the maximum length of the binary representation of the maximum possible grayscale value (255). It will be appreciated that the algorithm also handles the encryption of binary data. In such a case, the above dimension would be changed to 1×((Π(M,N))=Π(M,N).

The binary key produced at step 14, herein of dimensions 8×35, is too short to accommodate the image bit stream. Therefore, the key is resized towards the needed dimension, herein 8×(Π(M,N)) (step 16). This step would normally result in repetitive patterns, that would turn the ciphered image prone to attacks, which was independently noticed by Usman et al. (2007). To cope with this situation, a modified two-dimensional Discrete Cosine Transform (DCT) followed by a two-dimensional Fast Fourier Transform (FFT) is applied to provide the confusion and diffusion requirement and to tighten the security (step 22).

Prior to the transform operation, a matrix permutation (step 17) is performed on the resized key produced by step 16. Taking the Hash string H(P) generated in step 12, this is used as the seed for a Pseudo-Random Number Generator (PRNG) to produce a pseudo-random string. (It will be understood that any suitable key may be used as the seed for the PRNG, e.g. the original password P.) This pseudo-random sequence is used to permute the 8×(Π(M,N)) matrix of the binary key from step 16. The permuted matrix is then passed to the transform stage—step 22.

With regard to step 22, let the resized and permuted key bit stream from step 17 be $\lambda_{8,MN}$ where the subscripts M and N denote the width and height dimensions of the image. In step 22, the FFT operates as shown in Eq. (3) on the DCT transform of $\lambda_{8,MN}$, subject to Eq. (4), below.

$$f(u, v) = \frac{1}{8MN} \sum_{x=0}^{7} \sum_{y=0}^{MN-1} F(x, y) e^{-2\pi i(xu/8 + yv/MN)} \quad (3)$$

where $F(x,y)=DCT(\lambda_{k,l})$, satisfying Eq (4), and subject to:

$$F(x, y) = \begin{cases} 1 & \text{iff } DCT(\lambda_{8,MN}) > 0 \\ 0 & \text{Otherwise} \end{cases} \quad (*)$$

Note that for the transformation at the FFT and Discrete Cosine Transform (DCT) levels the whole coefficients are not utilised. Rather, the following rule is used, which generates at the end a binary random-like map. Given the output of Eq. (3), the binary map can be derived straightforwardly by:

$$\text{Map}(x, y) = \begin{cases} 1 & \text{iff } f(u, v) > thr \\ 0 & \text{otherwise} \end{cases} \quad (4)$$

where thr is an appropriately selected threshold value. For a balanced binary sequence and for robustness, thr should be chosen such that the probability P(f(u,v)<thr)=P(f(u,v)>thr).

As f(u,v) is a complex function, the thresholding of above Map(x,y) function can be based on the imaginary part of the complex function. In general, the complex imaginary part of the signal f(u,v) is symmetrical around zero (see FIG. 8 for validity of this property). Therefore, thr=0 can be an explicit solution.

However, it will be understood that the threshold thr may be adjusted subject to the requirements of the system.

Since the coefficients using this calculation are converted to binary map, the reconstruction of the password phrase is impossible, hence the name Irreversible Fast Fourier Transform (IrFFT). In other words, it is a one-way hash function which accepts initially a user password.

The map is then XORed with the respective bit stream versions of the RGB channels of the image (step 24). The separate XORed channels are then converted back into decimal values using a binary to decimal conversion system (step 26). These decimal values for the different channels (which can be interpreted as greyscale values) can then be combined and reshaped (step 28) to form the output ciphered (encrypted) image.

Nested transforms are not scant in the literature, for example O'Ruanaidh et al. (1997) use Fast Fourier Transform followed by log-polar mapping and followed by Fast Fourier Transform to embed a watermark.

The coding phase of the invention uses the Map (Eq. (4)) to encrypt the bit stream of the image A and produce a new encrypted matrix A', in such a way that:

$$\epsilon_{auth} \equiv \{(A - D(A', Map))\}, \quad (5)$$

where D(A',Map) denotes the decoding of A' with the same key generated Map.

Preferably, $\epsilon_{auth}$ should be equal to {Ø} (i.e. the null set), and starts to deviate from that when A' undergoes an image processing attack. Another phenomenon that is noticed is the sensitivity of the spread of the FFT coefficients to changes in the spatial domain. Therefore, when coupled with the sensitivity of the SHA-1 algorithm to changes of the initial condition, e.g. the Password phrase, the algorithm can easily meet the Shannon law requirements. For instance, a small change in the password phrase will, with overwhelming probability, result in a completely different hash. The following exemplifies such an assertion:

Input password: 'Steganography'

The corresponding Hash Function:

'40662a5f1e7349123c4012d827be8688d9fe013b'

Input password: 'Steganographie'

The corresponding Hash Function:

'c703bbc5b91736d8daa72fd5d620536d0dfbfe01'

It is intended to transform these changes into the spatial domain where 2D-DCT and 2D-FFT can be applied that introduce the aforementioned sensitivity to the two dimensional space. As such, images can be relatively easily encoded securely with password protection.

Note that this scheme encrypts efficiently grayscale and binary images. However, for RGB images it is noticed that using the same password for the three colours (R, G, and B) will yield some traceable patterns inherited from the original image. This is easily overcome through use of one of two options: either the user supplies three passwords, each of which encrypts one colour channel or, which is more convenient, two unique keys are generated from the original supplied password. In FIG. 4, for instance, a single key is utilised to generate the following different hash functions H($\overline{K}$), H($\overline{\overline{K}}$) and H(H($\overline{\overline{K}}$)) to encrypt the R, G and B channels respectively. K denotes the supplied key, and the arrows indicate the string reading directions.

Regarding the security aspects of the invention, encryption algorithms are assumed to be robust to different statistical and visual attacks, and moreover key sensitivity and key space should be adequate. It is possible to analyse the security of the invention by considering key space analysis, key sensitivity, adjacent pixels analysis and statistical analysis and other security merits.

Key Space Analysis

The key space analysis of the algorithm of the invention comes down to analysing SHA-1 algorithm. The hashing algorithm SHA-1 is used, and implemented in PHP (the popular web programming language). SHA-1 accepts any key of any length less than 264 bits. The SHA-1 is called secure because it is computationally infeasible to find a message which corresponds to a given message digest, or to find two different messages which produce the same message digest[2]. SHA-1 is well adopted in several organisations and has received much scrutiny from the cryptography community. The algorithm of the invention is flexible enough in case of migrating to a newer version of SHA's family or other secure hash functions.

Key Sensitivity Analysis

A number of tests were carried out on image databases consisting of popular test images such as 'Cameraman' or 'Lena'; images with different complexities and grayscale; colour and binary images. The algorithm of the invention has been proven to be very sensitive to initial condition, as can be seen from FIG. 5, thanks to the plugged in hash algorithm and the IrFFT.

Figure 5:
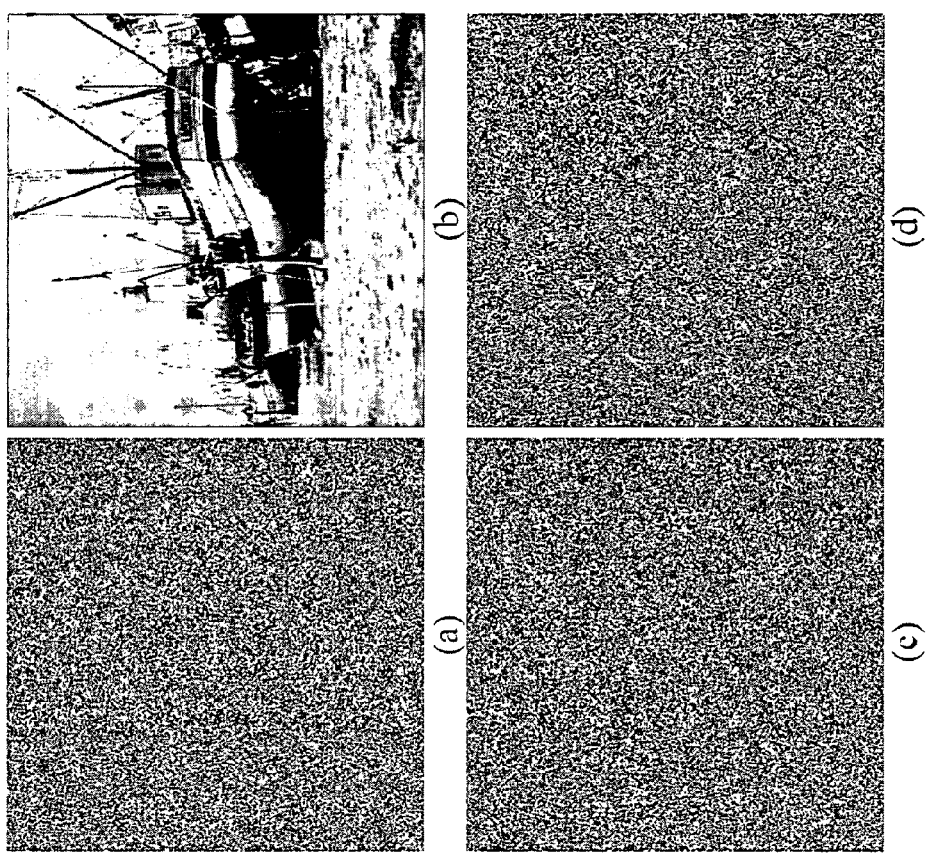
FIG. 5 shows the results of a sensitivity test of the method of the invention on a sample image.

FIG. 5 shows the results of a key sensitivity test using a sample image. FIG. 5(a) is the encrypted image; FIG. 5(b) is the encrypted image decrypted using the correct key 'Steganography', having the hash '40662a5f1e7349123c4012d827be8688d9fe013b'; FIG. 5(c) is the encrypted image decrypted using the wrong key 'Steganographie', having the hash 'c703bbc5b91736d8daa72fd5d620536d0dfbfe01'; and FIG. 5(d) is the encrypted image decrypted using a slightly modified hash '40662a5f1e7349123c4012d827be8688d9fe013B'. As can be seen from the images, even a minor change in the hash used does not result in a partially decrypted image.

Adjacent Pixels Analysis

To test for statistical properties of the original image and the encrypted version, a test was carried out based on the linear relationship between two adjacent pixels horizontally, vertically and diagonally. It is observed that natural images with natural data have high correlation ratio between neighbouring pixels (see FIG. 6). To measure such a relationship the correlation coefficient is calculated, as appears in Table 1, of each pair pixels using the following system:

$$Corr_{x,y} = \frac{1/N \sum_{i=1}^{N}(x_i - E(x_i))(y_i - E(y_i))}{\sqrt{1/N \sum_{i=1}^{N}(x_i - E(x_i))} \sqrt{1/N \sum_{i=1}^{N}(y_i - E(y_i))^2}}, \quad (6)$$

where

E(.) represents the excepted value or the mean of the observed data.

Figure 6:
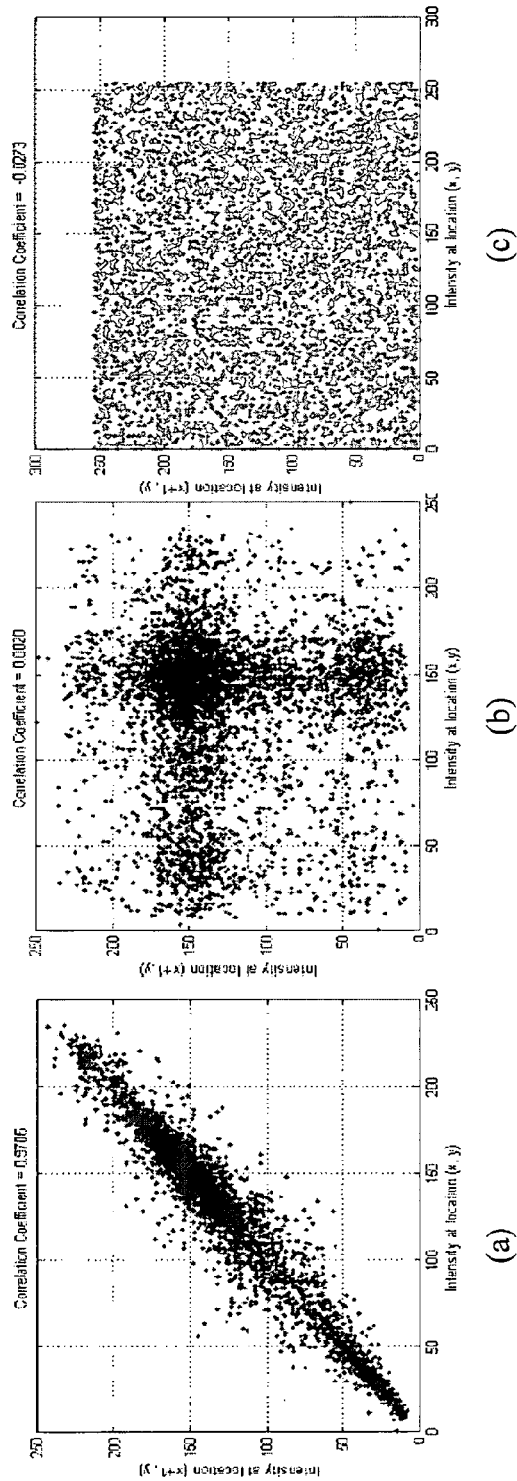
FIG. 6 shows a set of correlation analyses for the images of FIG. 5.

In FIG. 6, a correlation analysis is shown of 5000 pairs of horizontal adjacent pixels chosen randomly from the following images: (a) is for the original unencrypted plain boat image (FIG. 5(b)); (b) is for the re-arrangement of the pixels of FIG. 5(b) using conventional permutation; and (c) is for the encrypted image of FIG. 5(b) using the method of the invention. It can easily be seen that, while some patterning is still evident using the conventional permutation, the present invention results in a more thorough obfuscation of any data patterning.

Figure 7:
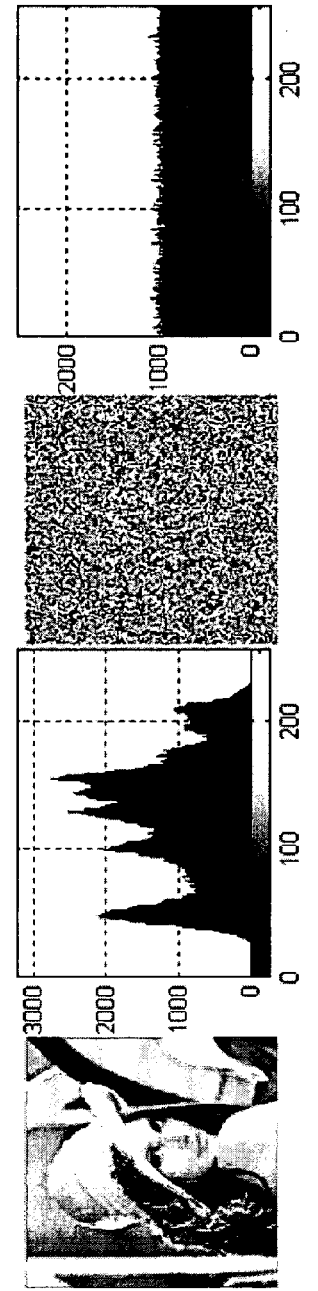
FIG. 7 shows a histogram analysis performed on sample image 'Lena', and the image when encrypted using the method of the invention.

The comparison given in Table 1 shows that the proposed algorithm outperforms other recent methods reported in the literature. To establish a fair evaluation, the same test image is used. In the horizontal, diagonal and vertical directions the encrypted version of the algorithm of the invention had the highest performance. Unlike other methods, the algorithm of the invention implies no iterations, the encrypted image shown in FIG. 7 is automatically generated once the program is invoked with a key.

TABLE 1

| Scan Direction | Original Image | Method of the Invention | Conventional Permutation | Wong et al. 2008 | Lian et al. 2005 | Zou et al. 2005 |
|---|---|---|---|---|---|---|
| Horizontal | 0.9851 | −0.003 | −0.0029 | 0.006816 | 0.005343 | 0.01183 |
| Vertical | 0.972 | 0.0015 | 0.0121 | 0.007827 | 0.00846 | 0.00872 |
| Diagonal | 0.9594 | −0.0019 | 0.0263 | 0.003233 | 0.003557 | 0.01527 |

Table 1 shows a performance analysis of the method of the invention against known prior art methods, using the 'Lena' test image. The correlation coefficients of pairs of adjacent pixels in different directions range from '1' (highly correlated) to '−1' (highly uncorrelated). These coefficients ensure the two considered images are statistically independent but with different degrees.

With regard to the conventional permutation, a permutation is a bijection function ($\phi$) that maps each element x in a set S to a different index $\ni \phi(x) \neq x$. It should be noted that this function, unlike the method of the invention, does not alter pixel values—it merely re-positions them.

From this table, it can be seen that the method of the invention produces greater performance than the prior art methods, as there is considerably less adjacent pixel correlation.

FIG. 7(a) shows the sample image 'Lena', and the image histogram analysis of the sample image. FIG. 7(b) shows the Lena image encrypted using the method of the invention, and the image histogram of the encrypted image. The process does not retain any image statistics—this can be seen from comparing histograms of the plain and encrypted images, as the original histogram is flattened and has a uniform distribution for the encrypted version.

Frequency Test

Given a randomly generated N-bit sequence, it is expected that approximately half the bits in the sequence to be ones and approximately half to be zeros. The frequency test checks that the number of ones in the sequence is not significantly different from N/2 (Kanso and Smaoui, 2007).

Figure 8:
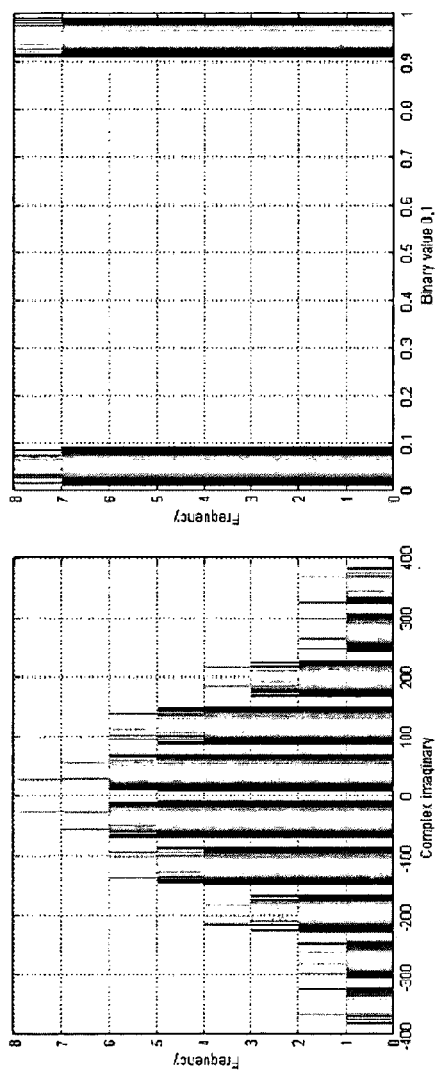
FIG. 8 shows the results of frequency tests performed on the encrypted version of the sample image 'Lena'.

In FIG. 8, an analysis of the frequency test is shown—FIG. 8(a) shows the complex imaginary part of f(x,y) in Eq. (3), while FIG. 8(b) shows the corresponding binary map after applying Eq. (4). The number of non-zero matrix elements is ($\approx$N/2)=39998, where N=100×100×8=80000.

It is noticed that the complex imaginary part of the Fast Fourier Transform exhibits conjugate symmetry in such a way that:

$$F(u,v) = |F(-u,-v)| \quad (7)$$

FIG. 8 shows such a property, where the magnitude of the transform is centred on the origin (F(u,v)=0). In other words, Eq. (4) yields a balanced binary sequence which passes this test. This assertion holds true for any 8-bit image. However, for 1-bit type, i.e., binary image, Eq. (3) employs no imaginary part, therefore, the real part is instead utilised which is also quasi-symmetrical.

Other Security Advantages

Apart from the above performance of the method of the invention, two additional merits of the method are highlighted.

Figure 9:
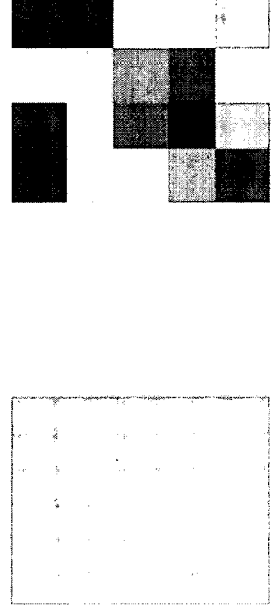
FIG. 9 shows two greyscale images and the associated grey values of each image—9(a) shows a cropped plain.patch from a natural image, and 9(b) shows the image of (a) encrypted using the method of the invention.

The first feature is that the proposed scheme is capable of not just scrambling data like all Chaos algorithms do, but also it changes the intensity of the pixels which contributes to the safety of the encryption. For convenience, FIG. 9 illustrates a cropped grayscale matrix of size 4×5 from a natural image (FIG. 9(a)), along with its encrypted version (FIG. 9(b)), and the associated grey values of each image. Notice that same gray values are producing different encryption values—this irregularity is very important to hamper any attempt to reverse attack the algorithm. As can be appreciated from the figure, the algorithm is operable to fuse the confusion and diffusion.

The second feature of the proposed algorithm is the unbiased handling of both gray scale and binary images. Chaos has a special case where they can be considered analogous to encryption, and that is when there is a binary plain image (consisting of 0 and 1 values).

FIG. 10 shows the encryption of an image consisting of a 10×10 black square on a white background—FIG. 10(a) shows the original binary image; FIG. 10(b) shows the image when encrypted using the method of the invention; and FIG. 10(c) shows the image encrypted after nine iterations using the Baker map (the dots were stretched using an erosion operation for better visualization (Fridrich, 1997)). It is clear that the approach of the invention provides more confusion than its counterparts (herein the Baker map). Note that all images shown in the figure are of binary type.

If an image contains homogenous areas, such as the one shown in FIG. 11(a), a large amount of redundant data will surf and thwart the efficiency of encryption algorithms, and laying the ground for a codebook attack. This is due to the consecutive identical pixels, which lead to the same repeated patterns when a block cipher is used in the Electronic Code Book (ECB) mode (Shujun et al., 2004).

FIG. 11(a) shows an uncompressed plain-image containing many areas with fixed gray-levels; FIG. 11(b) shows the corresponding encrypted image encrypted by 128-bit AES running in ECB mode (Shujun et al., 2004); and FIG. 11(c) shows the image encrypted using the algorithm of the invention. Since the algorithm of the invention is not block based, the problem of homogenous areas does not impact on the efficacy of the encryption.

Application to Steganography

After generating the encrypted payload, the colour transformation RGB→$YC_bC_r$ is used on the cover image which will carry the encrypted data. The use of such a transformation is to segment homogeneous objects in the cover image, namely the human skin region. The $YC_bC_r$ space can remove the strong correlation among R, G, and B matrices in a given image. In this approach, the concentration on skin tone is motivated by some applications of the final product. The algorithm starts first with segmentation of probable human skin regions:

$$C = Bck \cup \left( \bigcup_{i=1}^{n} S_i \right) \quad (8)$$

where: $S_i \cap S_j = \emptyset (\forall \, i \neq j)$

In Eq. (8) C denotes the cover image, Bck background regions and ($S_1, S_2, \ldots, S_n$) are connected subsets that correspond to skin regions.

Based on experiments carried out by the inventors, it has been found that embedding into these regions produces less distortion to the carrier image, compared to embedding in a sequential order or even in a noise-like fashion. In addition to this, the algorithm yields a robust output against reasonable noise attacks and translation. Robustness against noise is due to the embedding in the 1st-level 2D Haar DWT (Discrete Wavelet Transform) with the symmetric-padding mode.

DWT is a well known transformation that gained popularity among the image processing community, especially those who are dealing with image compression. Its applications in different areas is growing however (note that JPEG2000 uses DWT to compress images). 2D DWT provides a decomposition of the approximation, and the details in three orientations (horizontal, vertical, and diagonal) by means of a convolution-based algorithm using High and Low pass filters. In this case four filters associated with the orthogonal or bi-orthogonal of the Haar wavelet are computed.

A wavelet-based transformation is chosen over DCT (Discrete Cosine Transform) because: (a) the Wavelet transform understands the Human Vision System (HVS) more closely than does DCT; (b) Visual artefacts introduced by wavelet coded images are less evident compared to DCT, because the wavelet transform does not decompose the image into blocks for processing; and (c) DFT (Discrete Fourier Transform) and DCT are full frame transforms—hence any change in the transform coefficients affects the entire image except if DCT is implemented using a block-based approach.

However, DWT has spatial frequency locality, which means if the signal is embedded, it will affect the image locally (Potdar et al., 2005). Hence a wavelet transform provides both frequency and spatial description for an image. More helpful to information hiding, the wavelet transform clearly separates high-frequency and low-frequency information on a pixel-by-pixel basis (Raja et al., 2006). Manipulating coefficients in the wavelet domain tends to be less sensitive, unlike other transformations such as DCT and FFT.

For binary stream processing, there are two methods to convert decimal integer to a binary string: one is to use the conventional decimal to binary conversion, and the other is termed Binary Reflected Gray Code (BRGC)[3]. This binary mapping is the key to the augmented embedding capacity introduced by the method named "A Block Complexity Data Embedding (ABCDE)" proposed in (Hioki, 2002). There is a trade-off, however, between robustness and distortion, which is summarized in FIG. 12.

Figure 12:
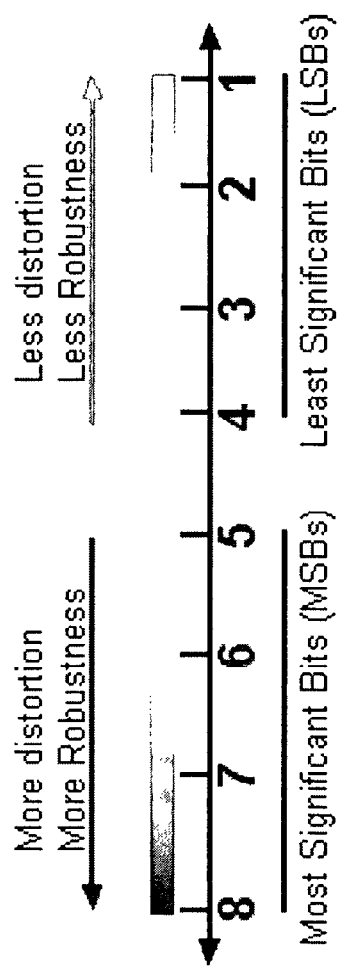
FIG. 12 is a diagram illustrating the trade-off between robustness and distortion in binary to integer conversion.

FIG. 12 shows an 8-bit (1 byte) representation of the conventional integer to binary conversion. It is clear that choosing the right index for embedding is very crucial. This intricacy is less severe when using the BRGC, since it produces seemingly disordered decimal-to-binary representation.

The resistance to geometric distortion is feasible since, unlike S-Tools and F5, when skin tone blobs are selected, eye coordinates can be detected, which act as reference points to recover the initial position and orientation. Thus, this makes the method of the invention invariant to both rotation and translation.

The proposed encryption scheme is preferably applied to digital image Steganography for two reasons, the first motivation is that embedding a random-like data into the Least Significant Bits (LSBs) would perform better than embedding the natural continuous-tone data, and secondly for security and fidelity reasons the embedded data must undergo a strong encryption, so even if it is accidentally discovered (which is unlikely to happen), the actual embedded data would not be revealed. More specifically, identification cards (ID cards), which are prone to forgery in aspects relating to Biodata alteration or photo replacement, are an ideal implementation of the method.

Figure 13:
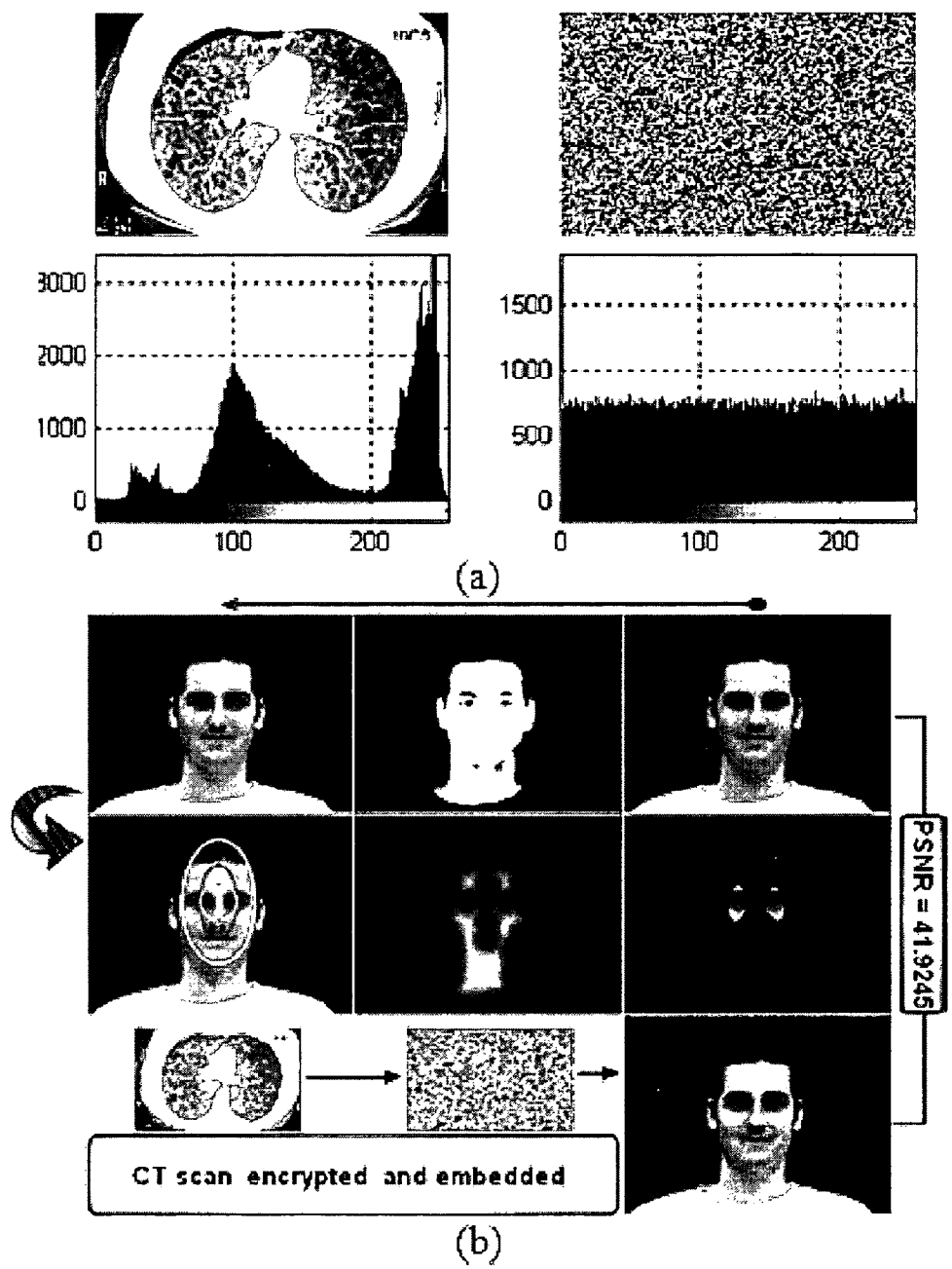
FIG. 13(a) shows a histogram analysis performed on a sample image of a patient's CT scan, and the image when encrypted using the method of the invention.
FIG. 13(b) shows the procedure for embedding such encrypted data in a face image.

To evaluate the performance of the proposed system, a set of RGB images were used for this purpose. FIG. 13 shows an example of the test data, with the associated PSNR value (discussed below).

FIG. 13(a) shows a set of image data to be encrypted—herein a CT scan of a young female with chronic breathlessness disease—and its encrypted version, each of which are shown along with their respective image histograms.

FIG. 13(b) outlines the process for the concealment of the medical data of FIG. 13(a) in a face image. Initially (starting from the top right corner), a face image is provided. The areas of skin tone present in the image are then detected, using any suitable skin tone detection method. The facial features are then extracted from the image, providing details such as the location of the eyes, nose, mouth, and the angle of rotation of the facial region. Finally, the encrypted version of the secret data (as shown in FIG. 13(a)) is embedded in the facial region of the image. Note that the use of biometric images facilitates having the embedding invariant to rotation and translation.

This method is discussed in more detail in UK Patent Application No. 0819407.8, filed Oct. 23, 2008, which is incorporated by reference herein.

It is believed that there are numerous different applications for such an extended 2D-SHA-1 algorithm, one of which is in the field of Steganography. This technology can overcome the difficulties mentioned previously.

It is shown that the results of the algorithm of the present invention is superior to the work of (Pisarchik et al., 2006) in terms of algorithm complexity and parameter requirements. Moreover, the algorithm is securely backed up by a strong 1D hash function. In (Pisarchik et al., 2006) the desired outcome converges after some iteration, which needs to be visually controlled to flag the termination of the program. However, the algorithm of the invention is run only once for each colour component (R, G and B). The algorithm of the invention needs only one input from the user (the password) and it will handle the rest of the process, while in (Pisarchik et al., 2006) three parameters—namely the reported a, j, and n—are required. The method of the invention can be applied to gray scale images as well as binary images. These extensions are not feasible in (Pisarchik et al., 2006) as they incorporate into their process relationships between the three primary colours (R, G and B). Finally, time complexity which is a problem admittedly stated in (Pisarchik et al., 2006) would be reduced greatly by adopting the method of the invention.

The algorithm was tested on the same test image described in (Pisarchik et al., 2006) to establish a fair judgement, namely "Mother Nature in the new Millennium", as shown in FIG. 14(a). To demonstrate visually the diffusion requirement being met, FIG. 14(b) illustrates the encrypted output of the test image with 'Steganography' as the password, with FIG. 14(c) showing the output with 'Steganographie' as the password. Even though only a small change has occurred in the password used, the final two chaotic maps differ dramatically as can be seen from FIG. 14(d), which shows the difference between (b) and (c).

Figure 14:
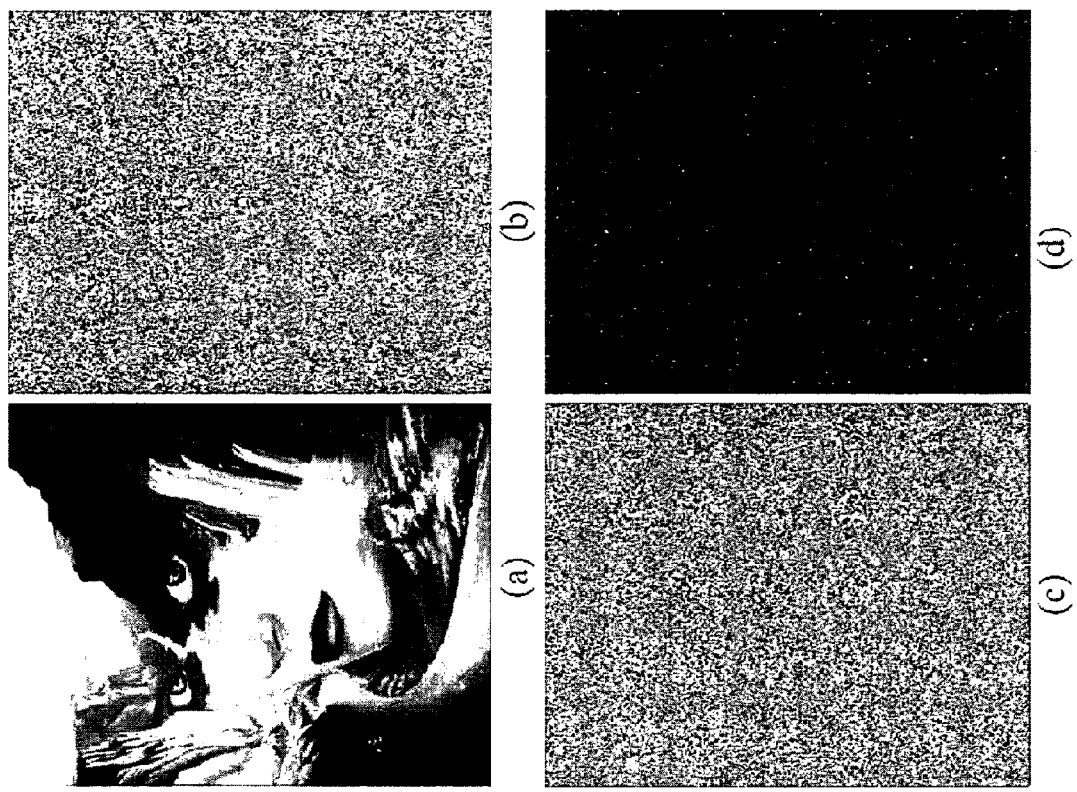
FIG. 14 shows the a test image "Mother Nature", and the difference in the encrypted versions of the test image when utilising relatively similar passwords.
Figure 15:
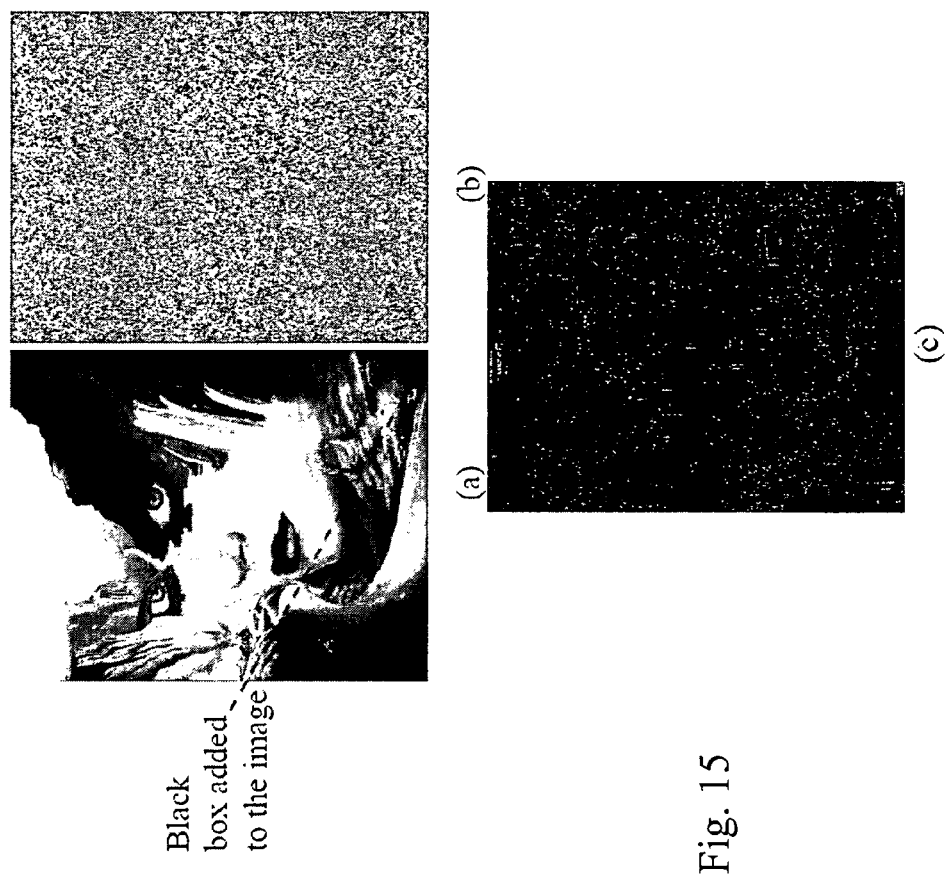
FIG. 15 illustrates the cryptographic diffusion produced through use of the method of the invention.

FIG. 15 shows the sensitivity of the algorithm to alterations on the 2D spatial data (i.e. the image). FIG. 15(a) shows the altered test image (a black box is added to the lower right-hand corner of the image), with FIG. 15(b) showing the altered image when encrypted using 'Steganography' as the password. To illustrate the sensitivity of the algorithm, FIG. 15(c) shows the difference between FIG. 15(b) and FIG. 14(b)—i.e. the difference in the output of the method of the invention when the original test image is altered slightly.

This sensitivity, combined with the sensitivity shown in FIG. 14, forms an excellent property of the algorithm of the invention. From FIG. 14 and FIG. 15 it is clearly seen that the 2D encryption of the invention meets the diffusion requirement for steganography.

Pisarchik et al. (2006) altered the test image by adding a black box at the lower right corner of the image and tried to visualise the difference by means of image histograms. Even though an image histogram is a useful tool, unfortunately it does not tell much about the structure of the image and in this case about the displacement of colour values. Histograms accumulate similar colours in distinguished bins regardless of their spatial arrangements. A better alternative would be to use similarity measurement metrics, such as the popular Peak Signal to Noise Ratio (PSNR).

PSNR values will run into infinity if the two examined sets are identical. PSNR is defined by the following system:

$$PSNR = 10\log_{10}\left(\frac{C_{max}^2}{MSE}\right) \quad (9)$$

where MSE denotes the Mean Square Error, which is given by:

$$MSE = \frac{1}{MN}\sum_{x=1}^{M}\sum_{y=1}^{N}(S_{xy} - C_{xy})^2 \quad (10)$$

and max C holds the maximum value in the examined image, for example:

$$C_{max} \leq \begin{cases} 1 \\ 255 \end{cases}$$

wherein $C_{max} \leq 1$ in double precision intensity images, and $C_{max} \leq 255$ in 8-bit unsigned integer intensity images; x and y are the image coordinates, M and N are the dimensions of the image, $S_{xy}$ is the original data and $C_{xy}$ is the modified data.

PSNR is often expressed on a logarithmic scale in decibels (dB). PSNR values falling below 30 dB indicate a fairly low quality (i.e., distortion caused by embedding can be obvious); however, a high quality Steganographic application should strive for 40 dB and above. Beneath are some key points that should be kept in mind when calculating PSNR.

Note 1: Many authors take the above values (1, 255) as the default values for $C_{max}$, in binary and 8-bit images respectively, regardless of the range of the examined intensity values. However, it can be the case for example that an 8-bit original image has its values range only from 3 to 240, and thus its $C_{max}$ would be then 240. Hence, $C_{max}$ is defined as the maximum fluctuation in the observed input image data. This makes $C_{max}$ an image dependent value.

Note 2: The PSNR is a universal formula, which can be straightforwardly applied when dealing with grayscale images. However, one can face a problem when confronting true RGB colour images. Some authors treat each colour channel (R, G and B) separately when calculating the MSE, prior to calculating the average MSE (AMSE) (Saenz et al., 2000; Yuan-Hui et al., 2007). MATLAB, on the other hand, advises that the RGB model be completely converted into YCbCr colour space, where the image primary colours (RGB) are represented by a weighted average in the Luma channel (Mathworks, see the reference). Consequently, the latter component (Y) is recommended to calculate the PSNR. The distortion that needs to be measured might have affected only colours; therefore, de-correlating such colours would not stipulate accurate results, at least from Steganography point of view, Mathworks' hint is not appropriate.

Note 3: The PSNR can easily be drawn based on incorrect attempts to calculate the MSE (the denominator in the PSNR Eq. (9)). Hence, image subtraction should be applied on double precision values, since deriving image differences based on 8-bit unsigned integers would yield different results since intensity values truncation would have taken place.

TABLE 2

| Chaos | FIG. 13(b) | FIG. 13(c) | FIG. 14(b) |
| --- | --- | --- | --- |
| FIG. 13(b) | Inf | 7.7765 dB | 33.6281 dB |
| FIG. 13(c) | 7.7765 dB | Inf | 7.7758 dB |
| FIG. 14(b) | 33.6281 dB | 7.7758 dB | Inf |

Table 2 shows the PSNR values of the different generated chaotic maps (the unit measurement of PSNR is decibel (dB)), which provides further detail regarding the diffusion aspect.

Pisarchik's algorithm (Pisarchik et al., 2006) involves a rounding operator applied each time the program is invoked by the different iterations. The present invention does not adopt this feature, as it is believed that there will be a loss of information when the embedded data is reconstructed. In the present invention, the algorithm works in one direction, and the recovery would be initiated by the same password and goes in parallel, i.e. not in the reverse order.

Figure 16:
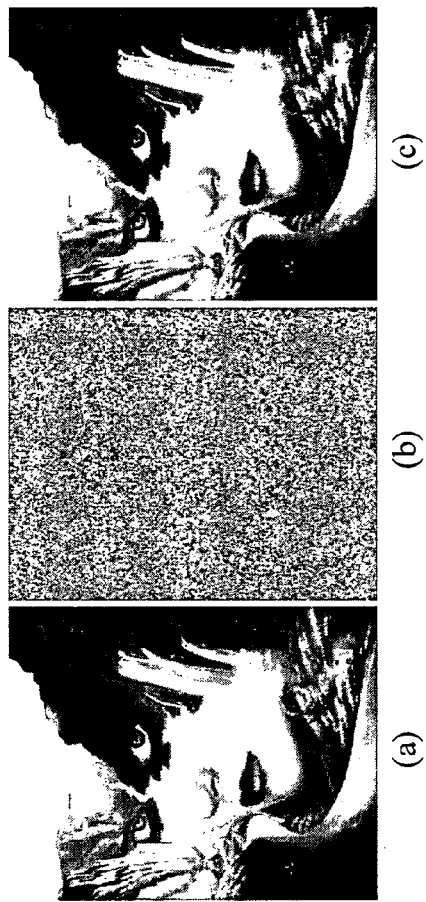
FIG. 16 shows the result of encrypting the test image "Mother Nature" using the method of the invention, and the recovery of the original image from the encrypted data.

FIG. 16(a) shows an input image ("Mother Nature"), 17(b) the encrypted image, and 17(c) the recovered image. In FIG. 16, the PSNR equals infinity, which means the two images are identical.

Figure 17:
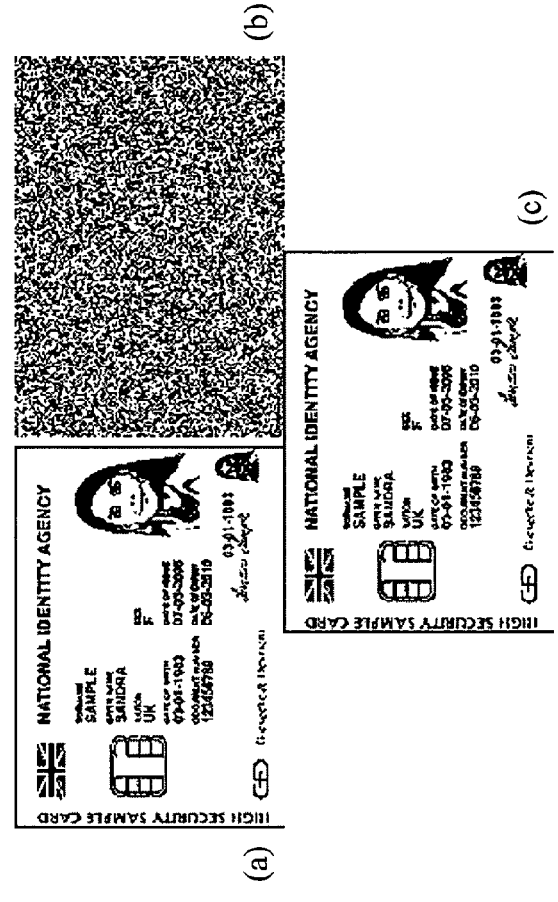
FIG. 17 shows the result of encrypting a test image of an ID card using the method of the invention, and the recovery of the original image from the encrypted data.

FIG. 17 shows the output of the algorithm when applied to a binary image, 17(a) being the original image, 17(b) the encrypted image, and 17(c) the recovered image with PSNR=infinity.

Figure 18:
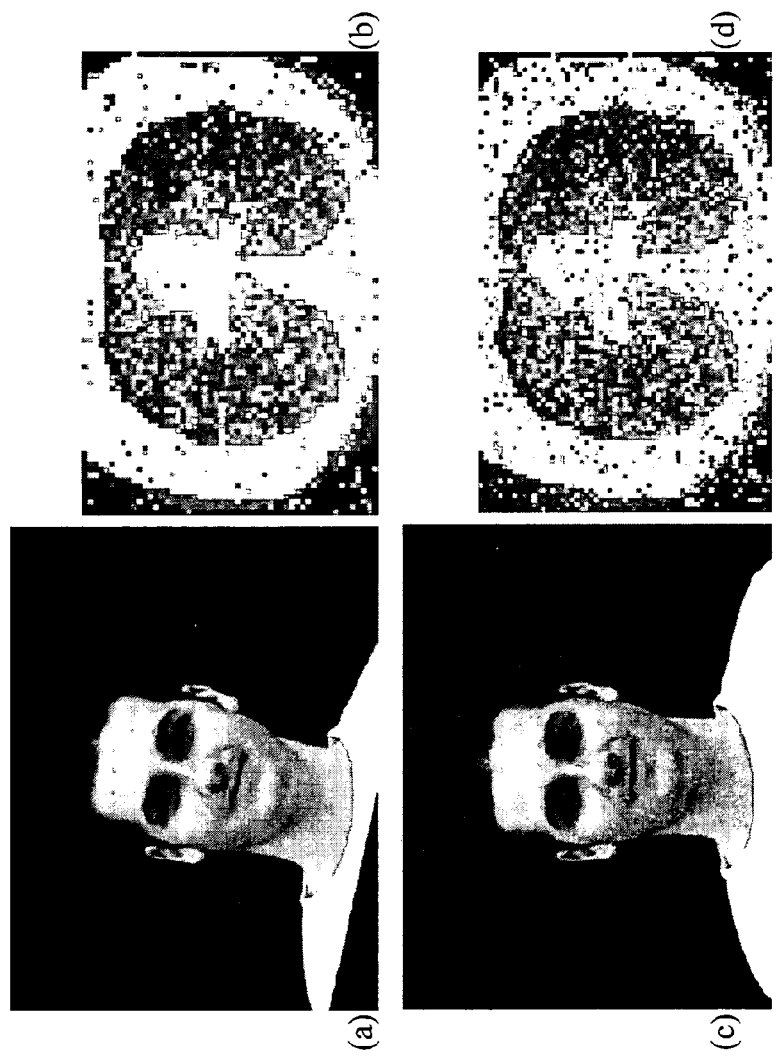
FIG. 18 shows the results of two image processing attacks on a Steganographic image encrypted with the method of the invention, illustrating the resistance of the method to the attacks.

Three types of attacks were carried out on the algorithm, namely noise impulses, rotation, and cropping attacks, as demonstrated in FIG. 18. FIG. 18 shows the resistance of the algorithm to image processing attacks, when carried out on the Steganographic image of FIG. 13. FIG. 18(a) shows the carrier Steganographic image top attacked with a joint attack of cropping and rotation of −12 degrees, with FIG. 18(b) showing the extracted secret data. In FIG. 18(c), the carrier Steganographic image is attacked with salt and pepper noise, with the recovered secret data shown in FIG. 18(d). FIG. 18 clearly demonstrates the resistance of the algorithm of the invention to image processing attacks.

The algorithm is capable to survive JPEG compression attack up to 75%—below that the hidden data will be totally destroyed. It is believed that that surmounting JPEG compression was enhanced by the encryption of the payload data, since encryption often significantly changes the statistical characteristics of the original multimedia source, resulting in much reduced compressibility (Mao and Wu, 2006). This resilience to attacks is deemed to be essential in image Steganography or watermarking. In this case, the algorithm of the invention performs better than Peng's algorithm (Peng and Liu, 2008).

Figure 19:
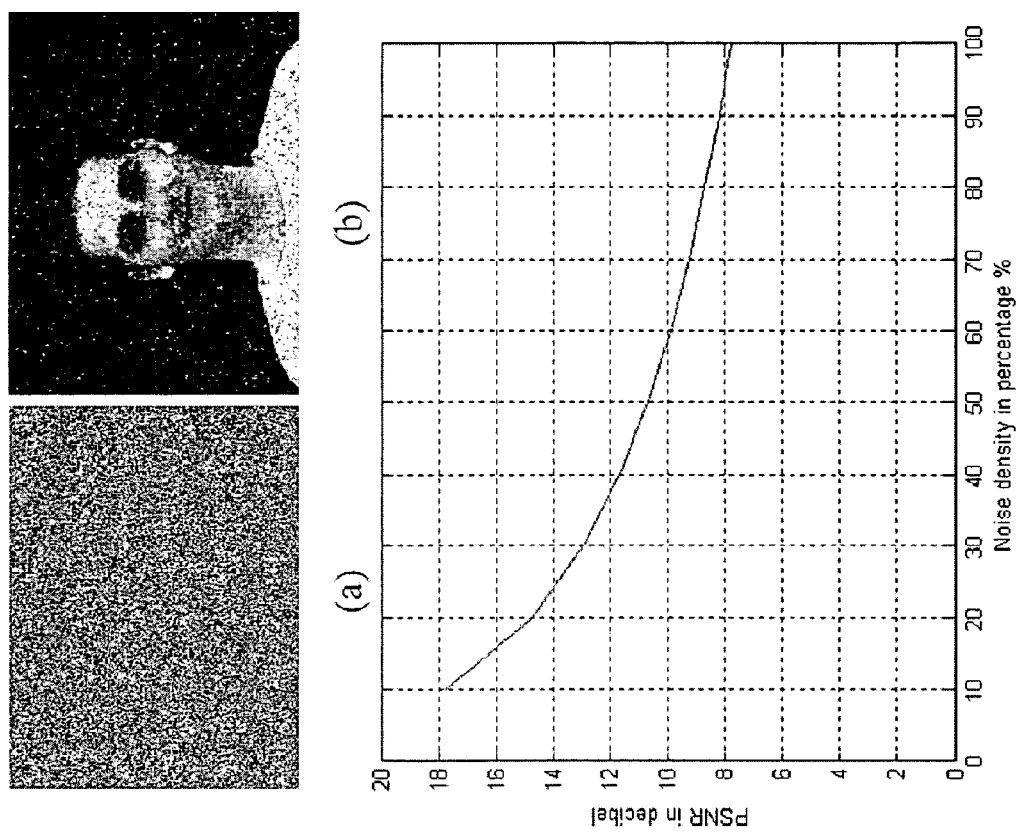
FIG. 19 illustrates the robustness of the method of the present invention.

The retrieved encrypted data was hit severely because the embedding strategy, for perceptibility reasons, took place in the Least Significant Bits of the carrier image (LSBs). If robustness of the encryption is considered alone without the embedding phase, much better performance can be seen, as depicted in FIG. 19.

In FIG. 19(a), a visual example of an encrypted image is attacked with salt and pepper noise of 20% density. In FIG. 19(b), the decrypted image is shown –PSNR=14.7057 dB–. FIG. 19(c) shows the PSNR versus noise density shown as a function.

Figure 20:
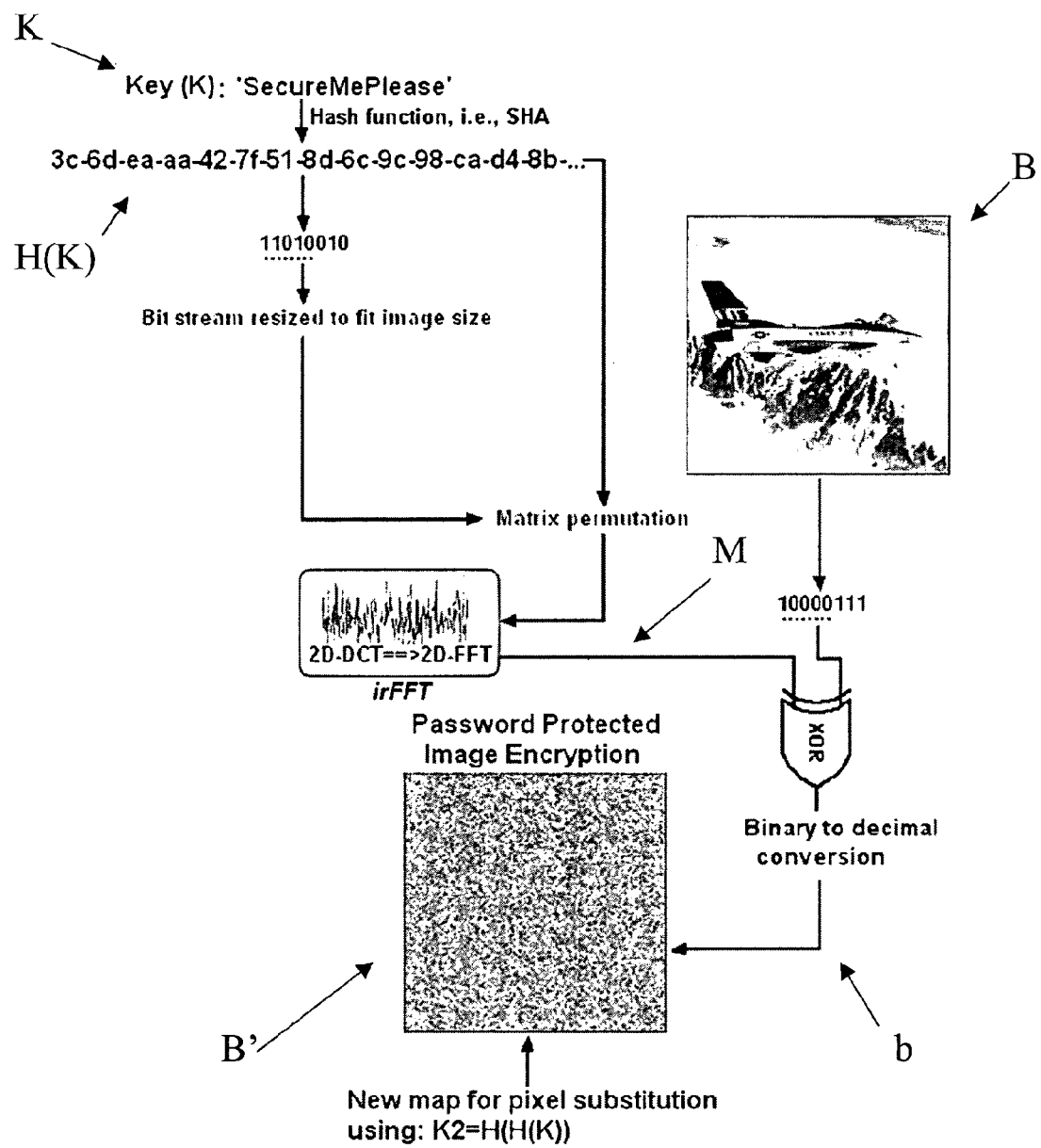
FIG. 20 is a further overview of the image encryption method of the invention, for a black-and-white image, further comprising a post-encryption for improving resistance to plain text attacks.

A further enhanced version of the method of the invention is shown in FIG. 20. This method includes a post-encryption step which improves the resistance of the algorithm to a Chosen-Plaintext Attack (CPA).

CPA is an attack model in which an attacker is presumed to have the ability to encrypt a plain image to obtain its corresponding cipher. The purpose of this attack is to exploit weaknesses in the encryption algorithm in the hope to reveal the scheme's secret key, as shown in equation (11).

$$A = A \otimes (B' \otimes \text{Map}) \qquad (11)$$

where A is the decrypted image, A' is the encrypted image, B' is the attacker's encrypted neutral image, $\otimes$ is the XOR operation, and Map is the key (see equation 4 above).

With reference to FIG. 20, the method is largely similar to the method illustrated in FIG. 4. Here, a password key K ("SecureMePlease") is passed through an appropriate hash function, e.g. SHA, to provide hash string H(K). As with above, the hash string is then converted to a binary bit stream, and is re-shaped to fit the size of the image in question, and permuted using a PRNG seeded with H(K). The modified DCT followed by FFT is then performed using Eqns. (3), (*), & (4), as above, to obtain a binary random-like map (output at M in the diagram).

In parallel, the original image B is converted to a bit stream and reshaped to have the required dimensions. (In contrast to the method of FIG. 4, the method shown in FIG. 20 is performed for a black-and-white image, removing the requirement to split the image up into the three separate RGB channels.) The binary map is XORed with the bit stream version of the image B. The result is then converted into grayscale values, then reshaped to form an encrypted image (indicated at b, at the output of the Binary to Decimal Conversion).

In order to reduce the threat of an attack using CPA, a new map K2 for pixel substitution is formed by hashing the hash of the original key, i.e. K2=H(H(K)). The purpose of this random map is to exchange the encrypted values falling on the ON pixels in the map with those falling on the OFF pixels and vice-versa. A new encrypted matrix B' can then be created, using equation (5) and the new pixel substitution map created from K2=H(H(K)).

With reference to FIG. 21, the pixel substitution process is illustrated in both matrix form (FIG. 21(a)) and vector form (FIG. 21(b)). A sample set of 2D data of dimensions 4×4 is indicated at 100 (representative of the encrypted 2D image matrix b resulting from the Binary to Decimal Conversion in FIG. 20). The pixel substitution map (e.g. K2 as described above) is indicated at 102. The appropriate swap configuration is determined based on the index of 1's and 0's in the pixel substitution map (the index shown at 104 in FIG. 21(b)), with the output of the pixel swap being the new encrypted matrix B' (indicated at 106).

With reference to the pixel substitution map 104, this means that the value in position (2) of the b array is swapped with the value in position (1) of the array, the value in position (3) is swapped with position (4), position (5) swapped with (6), position (9) swapped with (7), position (11) swapped with (8), position (14) swapped with (10), position (15) swapped with (12), and position (16) swapped with (13). The resultant 2D matrix 106 is equivalent to the encrypted matrix B' of FIG. 20.

Figure 22:
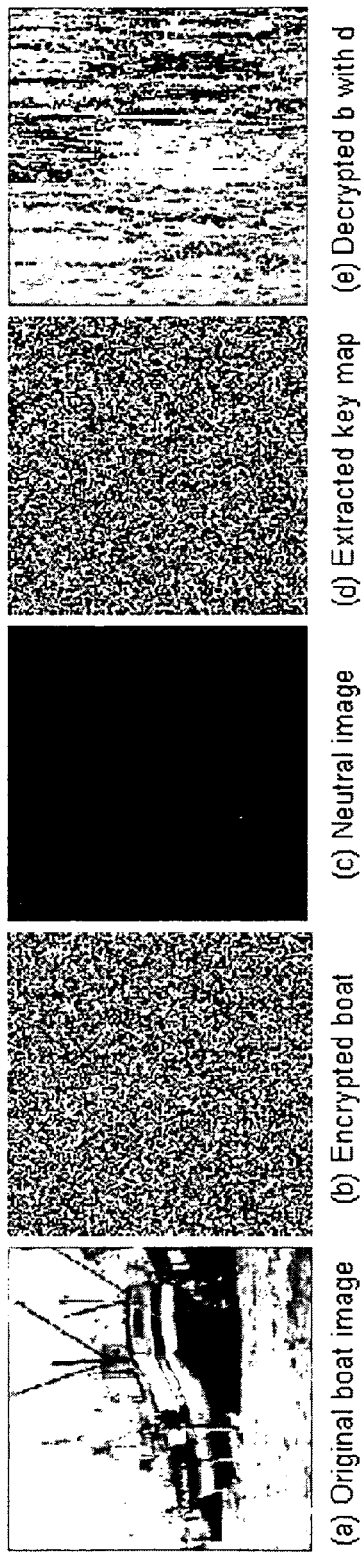
FIG. 22 shows the result of a Chosen-Plaintext Attack (CPA) on an image encrypted using the method of FIG. 20.

With reference to FIG. 22, the results of a sample CPA cryptanalysis attack are shown, according to equation (11) above. The original image is shown in FIG. 22(a), with the encrypted version shown in FIG. 22(b). The attacker's neutral image is shown in FIG. 22(c), which is encrypted with the same encryption key to produce to produce the attacker's version of B'. (The same encryption key is used in this sample to simulate a worst-case attack.)

The attacker's B'$\otimes$Map is shown in FIG. 22(d), which is used to decrypt FIG. 22(b) to produce FIG. 22(e), which in this case bears no resemblance to the original, unencrypted image. As can be seen from the figures, the use of the post-encryption step results in a resistance of the algorithm to worst-case attacks using CPA.

Figure 23:
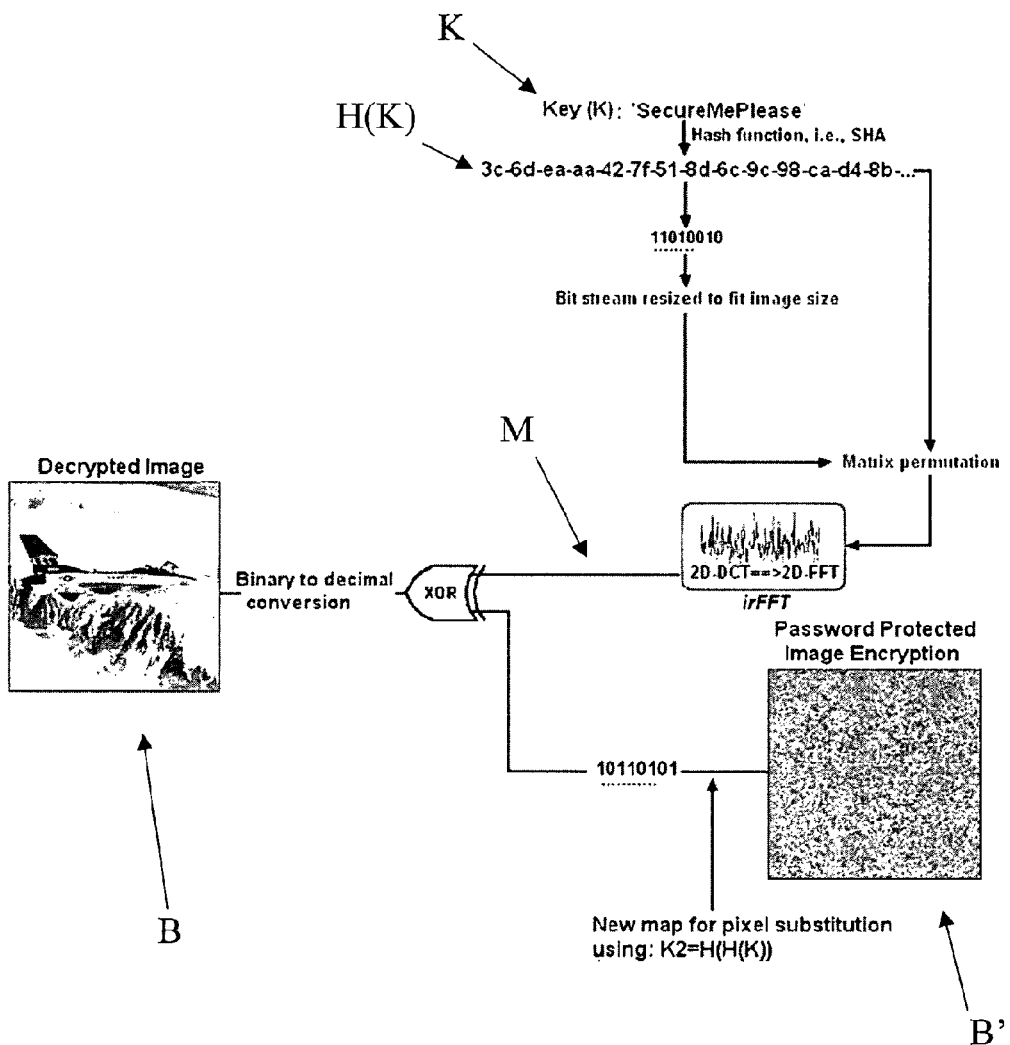
FIG. 23 shows the method of recovery of an encrypted image from the process shown in FIG. 20.

With reference to FIG. 23, the decryption process for the method shown in FIG. 20 is illustrated. Essentially, the decryption process is the encryption process in reverse. Knowing the encrypted image B', and the original key K "SecureMePlease", the key K is hashed to produce H(K), converted to binary and reshaped. Eqns. (3), (*), & (4) are performed to produce the binary random-like map (output indicated at M).

Taking the encrypted image B', the new pixel-substitution map K2=H(H(K)) is applied to provide a binary stream, which is then XORed with the binary random-like map and the output converted to decimal and reshaped to form the original, unencrypted image B. While the above describes a pixel substitution map for an image, it will be understood that the map may equally be applied to substitute elements in any 2D array.

A new encryption algorithm for two-dimensional data such as images has been shown. The algorithm is initiated by a password supplied by the user. Then an extension of the SHA-1 algorithm is provided to handle 2D data. An Irreversible Fast Fourier Transform (IrFFT) is applied to generate a more scattered data. It has been shown that the method of the invention outperforms that of (Pisarchik et al., 2006) in many ways. A security analysis for the proposed system is also presented. A comparison to other current systems is also highlighted, which shows the superiority of the algorithm of the invention. Finally, a useful application of the proposed cryptographic scheme in steganography has been described.

The invention is not limited to the embodiments described herein but can be amended or modified without departing from the scope of the present invention.

REFERENCES

1 Dutch Public Transit Card Broken, [online]. Available from: <http://www.cs.vu.nl/~ast/ov-chip-card/>, accessed on Feb. 3, 2008 at 15:37.
2 RFC3174—US Secure Hash Algorithm 1 (SHA1), [Online]. Available from: http://www.faqs.org/rfcs/rfc3174, accessed on 8 Jul. 2008 at 19:06.
3 Weisstein, Eric W. "Gray Code". [Online]. Available from World Wide Web from: <http://mathworld.wolfram.com/GrayCode.html>. Accessed on Oct. 6, 2008, at 11:42.
4 Lung Case Index, [online]. Available from <http://www.radiology.co.uk>, accessed on Oct. 7, 2008 at 20:15. Notice how the encryption gives all the gray values almost equal probability of occurrence.

REFERENCE DOCUMENTS

1. Brown, A. 1996. S-Tools [online]. [Accessed 4 Apr. 2008]. Available from World Wide Web: <http://www.jjtc.com/Security/stegtools.htm>

2. Westfeld, A. 2001. F5 [online]. [Accessed 4 Apr. 2008]. Available from World Wide Web: <http://wwwrn.inftu-dresden.de/~westfeld/f5.html>
3. Hioki H. (2002). A Data Embedding Method Using BPCS Principle with New Complexity Measures. Proceedings of the Pacific Rim Workshop on Digital Steganography, pp. 30-47.
4 Usman, K., Juzoji, H., Nakajima, I., Soegidjoko, S., Ramdhani, M., Hori, Toshihiro, H. and Igi, S. (2007). Medical Image Encryption Based on Pixel Arrangement and random Permutation for Transmission Security. Proc of the $9^{th}$ International Conference on e-Health Networking, Application and Services. 19-22 Jun. 2007, pp: 244-247.
5. Yang, Wang., Liao Xiaofeng., Xiao Di., and Wong Kwok-Wo. (2008). One-way hash function construction based on 2D coupled map lattices. Journal of Information Sciences 178 (2008) 1391-1406.
6. Lou, D. C. and Sung C. H. (2004). A Steganographic Scheme for Secure Communications Based on the Chaos and Euler Theorem. IEEE Transactions on Multimedia. 6(3): 501-509.
7. Bing, L. and Jia-wei, X. (2005). Period of Arnold transformation and its application in image scrambling. Journal of Central South University of Technology. 12(1): 278-282. Springer.
8. US Secure Hash Algorithm 1 [online]. [Accessed 5 Apr. 2008]. Available from World Wide Web: <http://www.faqs.org/rfcs/rfc3174>.
9. Wen, J., Severa, M., Zeng, W., Luttrell, M. H. and Jin, W. (2002). A format-compliant configurable encryption framework for access control of video. IEEE Trans. Circuits Syst. Video Technol., vol. 12, no. 6, pp. 545-557, June 2002.
10. Shih, F. (2008). Digital Watermarking and Steganography, Fundamentals and Techniques. CRC Press. USA, pp: 22-24. 11. Wang, Y., Ren, G., Jiang, J., Zhang, J. and Sun, J. (2007). Image Encryption Method Based on Chaotic Map. Proc of the $2^{nd}$ IEEE Conference on Industrial Electronics and Applications ICIEA 2007. 23-25 May 2007, pp: 2558-2560.
12. Ashtiyani, M., Birgani, P M., and Hosseini, H M. (2008). Chaos-Based Medical Image Encryption Using Symmetric Cryptography. Proc of the $3^{rd}$ International Conference on Information and Communication Technologies: From Theory to Applications, ICTTA 2008. 7-11 Apr. 2008, pp: 1-5.
13. Pisarchik A. N., Flores-Carmona N. J., and Carpio-Valadez M., (2006). Encryption and decryption of images with chaotic map lattices. Journal of CHAOS 16, 033118 (2006). The American Institute of Physics.
14. Sinha, A. and Singh, K. (2003). A technique for image encryption using digital signature. Optics Communications, Elsevier Science. 218(2003): 229-234.
15. Zou, J., Xiong, C., Qi, D. and Ward, R. K. (2005). The application of chaotic maps in image encryption. Proc of the $3^{rd}$ International IEEE-NEWCAS Conference. 19-22 Jun. 2005, pp: 331-334.
16. Fridrich, J. (1997). Secure Image Ciphering Based on Chaos. Final Report for AFRL, Rome N.Y., March 1997.
17. Kanso, A. and Smaoui, N. (2007). Logistic chaotic maps for binary numbers generations. Chaos, Solitons & Fractals. doi:10.1016/j.chaos.2007.10.049.
18. Shujun Li, Guanrong Chen, Xuan Zheng (2004). Chaos-based encryption for digital images and videos. In: Furht, B., Kirovski, D. (Eds.), Multimedia Security Handbook. pp. 133-167. CRC Press, Inc. Boca Raton, Fla., USA
19. Claude, E S. 1949. Communication Theory of Secrecy Systems. Bell System Technical Journal. 28(4), pp: 656-715.
20. Refregier, P. and Javidi, B. (1995). Optical image encryption based on input plane and Fourier plane random encoding. Optics Letters. 20 (7), pp: 767.
21. Gopinathan, U., Monaghan, D. S., Naughton, T. J., Sheridan, J. T. and Javidi, B. (2005). Strengths and weaknesses of optical encryption algorithms. Proc of the $18^{th}$ Annual Meeting of the IEEE Lasers and Electro-Optics Society. 22-28 October, pp: 951-952.
22. Singh, M., Kumar, A. and Singh. K. (2008). Encryption and decryption using a sandwich phase diffuser made by using two speckle patterns and placed in the Fourier plane: Simulation results. Optik Journal, article in press.
23. Joshi, M. Shakher, C. and Singh, K. (2008). Image encryption and decryption using fractional Fourier transform and radial Hilbert transform. Optics and Lasers in Engineering. 46 (2008) pp: 522-526.
24. Fridrich J. and Goljan. M. (2000). Robust Hash Functions for Digital Watermarking. ITCC 2000, Las Vegas, Nev. Mar. 27-29, 2000, pp: 173-178.
25. Martinian, E., Yekhanin, S. and Yedidia, J. S. (2005). Secure Biometrics Via Syndromes. In Proceedings of the Allerton Conference on Communication, Control, and Computing.
26. Wong, K W., Kwok, B. S H. and Law, W S. (2008). A fast image encryption scheme based on chaotic standard map. Physics Letters A. 372 (2008), pp: 2645-2652.
27. Lian, S J. and Wang. S Z. (2005). A Block Cipher Based on a Suitable Use of the Chaotic Standard Map. International Journal of Chaos, Solitons and Fractals. 26 (1), pp: 117-129.
28. Encinas, L H. and Dominguez, A P. (2006). Comment on 'A technique for image encryption using digital signature'. Optics Communications, Elsevier Science. 268(2006): 261-265.
29. Sinha, A. and Singh, K. (2006). Reply to comment on "A technique for image encryption using digital signature". Optics Communications, Elsevier Science. 268(2006): 266-268.
30. Potdar V. M., Song Han and Chang E. (2005). A Survey of Digital Image Watermarking Techniques. $3^{rd}$ IEEE International Conference on Industrial Informatics (INDIN), pp: 709-716.
31. Raja K. B., Vikas, Venugopal K. R., and Patnaik L. M., (2006). "High Capacity Lossless Secure Image Steganography using Wavelets". International Conference on Advanced Computing and Communications, ADCOM 2006, pp: 230-235.
32. Saenz M, Oktem R, Egiazarian K and Delp E., (2000). Colour image wavelet compression using vector morphology. Proc. of the European Signal Processing Conference, Sep. 5-8 2000.
33. Yuan-Hui Yu, Chin-Chen Chang, Feng Chia, Iuon-Chang Lin. A. (2007). New steganographic method for colour and grayscale image hiding. Computer Vision and Image Understanding. Volume 107, Issue 3 (September 2007). pp. 183-194.
34. Mathworks, [Online]. [Accessed on 28 Nov. 2007 at 18:55]. Available from World Wide Web: <http://www.mathworks.com/access/helpdesk/help/toolbox/vipblks/ref/psnr.html>.
35. Cheddad, A., Mohamad D. and abd Manaf, A. (2008a). Exploiting Voronoi Diagram Properties in Face Segmentation and Features Extraction. Pattern Recognition (2008), http://dx.doi.org/10.1016/j.patcog.2008.06.007, Elsevier Science.
36. Cheddad, A., Condell, J., Curran, K. and Mc Kevitt, P. (2008b). Biometric Inspired Digital Image Steganography. Proceedings of the 15$^{th}$ Annual IEEE International Conference and Workshops on the Engineering of Computer-Based Systems (ECBS'08). pp. 159-168.
37. O'Ruanaidh, J. J. K. and Pun, T. (1997). Rotation, scale and translation invariant digital image watermarking. Proceedings IEEE International Conference on Image Processing 1997 (ICIP 97), Santa Barbara, Calif., USA, vol. 1, pp. 536-539, October 1997.
38. Mao, Y. and Wu, M. (2006). A Joint Signal Processing and Cryptographic Approach to Multimedia Encryption. IEEE Transactions on Image Processing, (15): 7, Jul. 2006, pp: 2061-2075.
39. Peng, Z. and Liu, W. (2008). Color image authentication based on spatiotemporal chaos and SVD. Chaos Solitons & Fractals, Volume 36, Issue 4, May 2008, Pages 946-952.

The invention claimed is:

1. A method of encrypting a set of two-dimensional (2D) input data, the method comprising:
(a) receiving a set of 2D input data, wherein the input data has at least three color space components;
(b) outputting an encrypted 2D data set; and
(c) in a hardware processor, performing the steps of:
  (i) providing three different one-dimensional (1D) hash strings H($\overline{P}$), H($\overline{P}$) and H(H($\overline{P}$)), wherein the arrows indicate the string reading directions, and
  (ii) resizing said 1D hash strings to provide an individual 2D hash array for each colour space component of the 2D image data set;
  (iii) performing a transform operation on the 2D hash array;
  (iv) generating a binary pseudorandom map based on the transformed 2D hash array; and
  (v) generating an encrypted 2D data set by performing a logical XOR operation using the binary pseudorandom map and the bit stream version of the 2D input data.

2. The method of claim 1, wherein the 2D input data comprises an image file defined in a multi-dimensional colour space the 2D input data may comprise any known file format that is capable of being represented electronically as a two-dimensional data set.

3. The method of claim 1, wherein step (d) further comprises the step of converting the XORed bit stream into grayscale values to generate an encrypted 2D data set.

4. The method of claim 1, wherein the binary pseudorandom map is generated such that:

$$\mathrm{Map}(x, y) = \begin{cases} 1 & \text{iff } f(u, v) > thr_1 \\ 0 & \text{otherwise} \end{cases}$$

where Map(x,y) is the binary pseudorandom map, f(u,v) is an input function based on the transformed 2D hasharray, and $thr_1$ is a threshold value.

5. The method of claim 4, wherein $thr_1$ is chosen such that the probability $P(f(u,v)<thr_1)=P(f(u,v)>thr_1)$.

6. The method of claim 4, wherein $thr_1=0$.

7. The method of claim 1, wherein said step (d) is performed such that the set of 2D input data, A, and the encrypted 2D data set, A', conform to the relationship:

$$\{A - D(A', \mathrm{Map})\} = \{\emptyset\}$$

where D(A',Map) is the decoding of A' and Map is the binary pseudorandom map.

8. The method of claim 1, wherein the transform operation comprises a Discrete Cosine Transform (DCT) and a Fast Fourier Transform (FFT).

9. The method of claim 8, wherein the transform operation comprises:

$$f(u, v) = \frac{1}{8MN} \sum_{x=0}^{7} \sum_{y=0}^{MN-1} F(x, y) e^{-2\pi i(xu/8 + yv/MN)}$$

where F(x,y) is based on DCT($\lambda_{8,MN}$) subject to a transform thresholding operation, wherein $\lambda_{8,MN}$ is the 2D hash array, the subscripts 8 and MN denote the width and height respectively of the 2D hash array, and wherein M and N are the width and height dimensions of the original 2D input data.

10. The method of claim 9, wherein the transform thresholding operation is:

$$F(x, y) = \begin{cases} 1 & \text{iff } DCT(\lambda_{8,MN}) > thr_2 \\ 0 & \text{otherwise} \end{cases}$$

where F(x,y) is the input into the transform operation f(u, v), DCT($\lambda_{8,MN}$) is the Discrete Cosine Transform of the 2D hash array, and $thr_2$ is a threshold value.

11. The method of claim 10, wherein $thr_2$ is chosen such that the probability $P(F(x,y)<thr_2)=P(F(x,y)>thr_2)$.

12. The method of claim 1, wherein step (a) comprises:
providing a one-dimensional (1D) hash string H(P); and
resizing the 1D hash string H(P) to a 2D hash array.

13. The method of claim 12, wherein the step of providing a 1D hash string comprises generating a 1D hash string H(P) by applying a hash function to a password P.

14. The method of claim 12, wherein step (b) includes the step of converting the 1D hash string H(P) into the binary equivalent of H(P).

15. The method of claim 12, wherein the step (d) of encoding the set of 2D input data to be encrypted comprises:
(i) generating a binary pseudorandom map based on the transformed 2D hash string; and
(ii) generating an encrypted 2D data set by performing a logical XOR operation using the binary pseudorandom map and the bit stream version of the 2D input data.

16. The method of claim 12, wherein the bit stream of the 1D hash string H(P) is resized to a 2D matrix.

17. The method of claim 16, wherein the bit stream of the 2D input data is resized to have the dimension of 8×(Π(M, N)), where M×N is the dimension of the bit stream of the 2D input data.

18. The method of claim 16, wherein the 2D matrix has a fixed dimension of 8×35.

19. The method of claim 12, wherein the 2D input data comprises an image file defined in a multi-dimensional colour space, and wherein the step of generating an encrypted 2D image data set comprises:
performing a plurality of logical XOR operations using a binary pseudorandom map and the bit stream version of each of the colour space components of the 2D image input data to generate encrypted colour space data sets; and
combining the encrypted colour space data sets to form the encrypted 2D image data set.

20. The method of claim 19, wherein steps (a) to (c) are repeated to provide a binary pseudorandom map for each colour space component of the 2D image data set.

21. The method of claim 19, wherein the step of providing a 1D hash string comprises generating a 1D hash string H(P) by applying a hash function to a password P, and wherein a different password is provided for each individual colour space component.

22. The method of claim 12, wherein step (c) is performed on a permuted version of the 2D hash string.

23. The method of claim 22, wherein said permuted version of the 2D hash string is generated by performing a pseudorandom permutation operation on said 2D hash string.

24. The method of claim 23, wherein said pseudorandom permutation is based on the output of a pseudo-random number generator, wherein the seed for the pseudo-random number generator is selected from one of the following: the 1D hash string H(P); or an unhashed 1D password P.

25. The method of claim 12, wherein the method further comprises a post-encryption step, the step comprising:
   (iii) providing an element substitution map based on the 1D hash string H(P); and
   (iv) performing an element substitution operation based on said element substitution map on the elements of said encrypted 2D data set to generate an element-substituted encrypted 2D data set.

26. The method of claim 25, wherein said step of providing comprises generating said element substitution map by applying a hash function to the 1D hash string H(P).

27. The method of claim 1, wherein the 2D image data set comprises an image file defined in a multi-dimensional colour space, and wherein the step of generating an encrypted 2D image data set comprises:
   performing a plurality of logical XOR operations using a binary pseudorandom map and the bit stream version of each of the colour space components of the 2D image input data to generate encrypted colour space data sets; and
   combining the encrypted colour space data sets to form the encrypted 2D image data set.

28. The method of claim 27, wherein steps (a) to (c) are repeated to provide a binary pseudorandom map for each colour space component of the 2D image data set.

29. The method of claim 28, wherein step (a) comprises providing an individual 2D hash array for each colour space component of the 2D image data set.

30. The method of claim 29, wherein step (a) comprises generating individual 2D hash arrays for each colour space component based on a password P, wherein said individual 2D hash arrays are based on a combination of different string reading directions and/or multiple hashing operations.

31. The method of claim 1, wherein the 2D input data comprises a 2D image data set defined in three-dimensional colour space.

32. The method of claim 31, wherein the three-dimensional colour space is RGB space.

33. The method of claim 1, wherein the method further comprises the step of resizing the encrypted 2D data set to have the same dimensions as the 2D input data.

34. The method of claim 1, wherein step (b) is performed on a permuted version of the 2D hash array.

35. The method of claim 34, wherein said permuted version of the 2D hash array is generated by performing a pseudorandom permutation operation on said 2D hash array.

36. The method of claim 1, wherein the method further comprises a post-encryption step, the step comprising:
   (i) providing an element substitution map; and
   (ii) performing an element substitution operation based on said element substitution map on the elements of said encrypted 2D data set to generate an element-substituted encrypted 2D data set.

37. The method of claim 36, wherein said step of providing comprises generating said element substitution map by applying a hash function to the 1D hash string H(P).

38. A method of decrypting a set of encrypted 2D data, the data encrypted according to the method of claim 1, the method comprising the steps of:
   (a) providing a 1D hash string H(P);
   (b) resizing the 1D hash string H(P) to a 2D hash string;
   (c) performing a transform operation on the 2D hash string; and
   (d) decoding the set of encrypted 2D data based on the transformed 2D hash string to provide a decrypted 2D data set.

39. A non-transitory computer program product comprises a computer readable medium on which computer instructions are stored which when executed in a computing device are arranged to encrypt a set of two-dimensional (2D) input data by:
   (a) receiving a set of 2D input data, wherein the input data has at least three color space components;
   (b) outputting an encrypted 2D data set; and
   (c) in a hardware processor performing the steps of:
      (i) providing three different one-dimensional (1D) hash strings $H(\vec{P}), H(\overleftarrow{P})$ and $H(H(\vec{P}))$, wherein the arrows indicate the string reading directions, and
      (ii) resizing said 1D hash strings to provide an individual 2D hash array for each colour space component of the 2D image data set;
      (iii) performing a transform operation on the 2D hash array;
      (iv) generating a binary pseudorandom map based on the transformed 2D hash array; and
      (v) generating an encrypted 2D data set by performing a logical XOR operation using the binary pseudorandom map and the bit stream version of the 2D input data.

40. An encryption system for encrypting a set of two-dimensional (2D) input data, the system comprising:
   (a) an input device operable to receive a set of 2D input data, wherein the input data has at least three color space components;
   (b) an output device operable to output an encrypted 2D data set; and
   (c) in a hardware processor performing the steps of:
      (i) providing three different one-dimensional (1D) hash strings $H(\vec{P})$, $H(\overleftarrow{P})$ and $H(H(\vec{P}))$, wherein the arrows indicate the string reading directions, and
      (ii) resizing said 1D hash strings to provide an individual 2D hash array for each colour space component of the 2D image data set;
      (iii) performing a transform operation on the 2D hash array;
      (iv) generating a binary pseudorandom map based on the transformed 2D hash array; and
      (v) generating an encrypted 2D data set by performing a logical XOR operation using the binary pseudorandom map and the bit stream version of the 2D input data.

* * * * *